(12) United States Patent
Kitani et al.

(10) Patent No.: US 11,511,351 B2
(45) Date of Patent: Nov. 29, 2022

(54) ADDITIVE MANUFACTURING APPARATUS AND METHOD FOR MANUFACTURING THREE-DIMENSIONALLY SHAPED OBJECT

(71) Applicant: CANON KABUSHIKI KAISHA, Tokyo (JP)

(72) Inventors: Koji Kitani, Chofu (JP); Naoki Takizawa, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 492 days.

(21) Appl. No.: 16/516,675

(22) Filed: Jul. 19, 2019

(65) Prior Publication Data

US 2020/0047250 A1 Feb. 13, 2020

(30) Foreign Application Priority Data

Aug. 10, 2018 (JP) .............................. JP2018-152012
Jul. 5, 2019 (JP) .............................. JP2019-126029

(51) Int. Cl.
*B33Y 30/00* (2015.01)
*B33Y 10/00* (2015.01)
*B22F 12/00* (2021.01)
*B22F 10/10* (2021.01)

(52) U.S. Cl.
CPC .............. *B22F 12/00* (2021.01); *B33Y 10/00* (2014.12); *B33Y 30/00* (2014.12); *B22F 10/10* (2021.01)

(58) Field of Classification Search
CPC .......... B22F 12/00; B22F 10/10; B22F 10/30; B22F 10/20; B22F 3/003; B22F 10/00; B33Y 30/00; B33Y 10/00; B33Y 50/02; Y02P 10/25; B29C 64/393; B29C 64/153; B29C 64/205
See application file for complete search history.

(56) References Cited

U.S. PATENT DOCUMENTS

| | | | |
|---|---|---|---|
| 7,754,135 B2 | 7/2010 | Abe et al. | |
| 9,592,554 B2 | 3/2017 | Abe et al. | |
| 10,195,693 B2* | 2/2019 | Buller | ..................... B22F 10/40 |
| 10,252,333 B2* | 4/2019 | McMurtry | .............. B22F 10/20 |
| 10,288,403 B2* | 5/2019 | Li | ............................. G01D 5/30 |

(Continued)

FOREIGN PATENT DOCUMENTS

| | | |
|---|---|---|
| CN | 203479263 U | 3/2014 |
| CN | 105451970 A | 3/2016 |

(Continued)

OTHER PUBLICATIONS

First Office Action in Chinese Application No. 201910719224.0 (dated Oct. 2021).

*Primary Examiner* — Lawrence Averick
(74) *Attorney, Agent, or Firm* — Venable LLP

(57) ABSTRACT

An additive manufacturing apparatus includes a powder layer forming portion, an energy beam source, and a contact detection sensor including a plate-like probe. The powder layer forming portion is configured to form a powder layer in a predetermined region. The energy beam source is configured to radiate an energy beam to the powder layer formed by the powder layer forming portion to fuse or sinter the powder layer so that a solidified layer is formed. Presence or absence of a projection portion on a surface of the solidified layer is detected by using the contact detection sensor.

21 Claims, 12 Drawing Sheets

(56) References Cited

U.S. PATENT DOCUMENTS

| | | | | |
|---|---|---|---|---|
| 10,493,564 | B2* | 12/2019 | Buller | B29C 64/153 |
| 10,507,549 | B2* | 12/2019 | Buller | B23K 26/123 |
| 10,919,220 | B2* | 2/2021 | Stevens | B29C 64/209 |
| 11,172,011 | B2* | 11/2021 | Skupin | H04N 21/23476 |
| 2016/0136731 | A1* | 5/2016 | McMurtry | B29C 64/153 |
| | | | | 419/53 |
| 2016/0297006 | A1* | 10/2016 | Buller | B28B 1/001 |
| 2017/0144254 | A1* | 5/2017 | Buller | B23K 26/70 |
| 2017/0176162 | A1* | 6/2017 | Li | G01B 5/012 |
| 2017/0189963 | A1* | 7/2017 | Buller | B29C 64/171 |
| 2017/0259498 | A1* | 9/2017 | Stevens | B29C 64/106 |
| 2017/0282244 | A1 | 10/2017 | Mizuno et al. | |
| 2017/0282296 | A1 | 10/2017 | Kitani et al. | |
| 2018/0009165 | A1* | 1/2018 | Agawa | B22F 10/20 |
| 2018/0071987 | A1* | 3/2018 | Tsumuraya | B22F 10/20 |
| 2019/0134891 | A1* | 5/2019 | Mamrak | B29C 64/153 |
| 2020/0137136 | A1* | 4/2020 | Skupin | H04N 21/234345 |

FOREIGN PATENT DOCUMENTS

| | | |
|---|---|---|
| CN | 107584760 A | 1/2018 |
| JP | 2004-277881 A | 10/2004 |
| WO | 2012/160811 A1 | 11/2012 |
| WO | 2014/199150 A1 | 12/2014 |

* cited by examiner

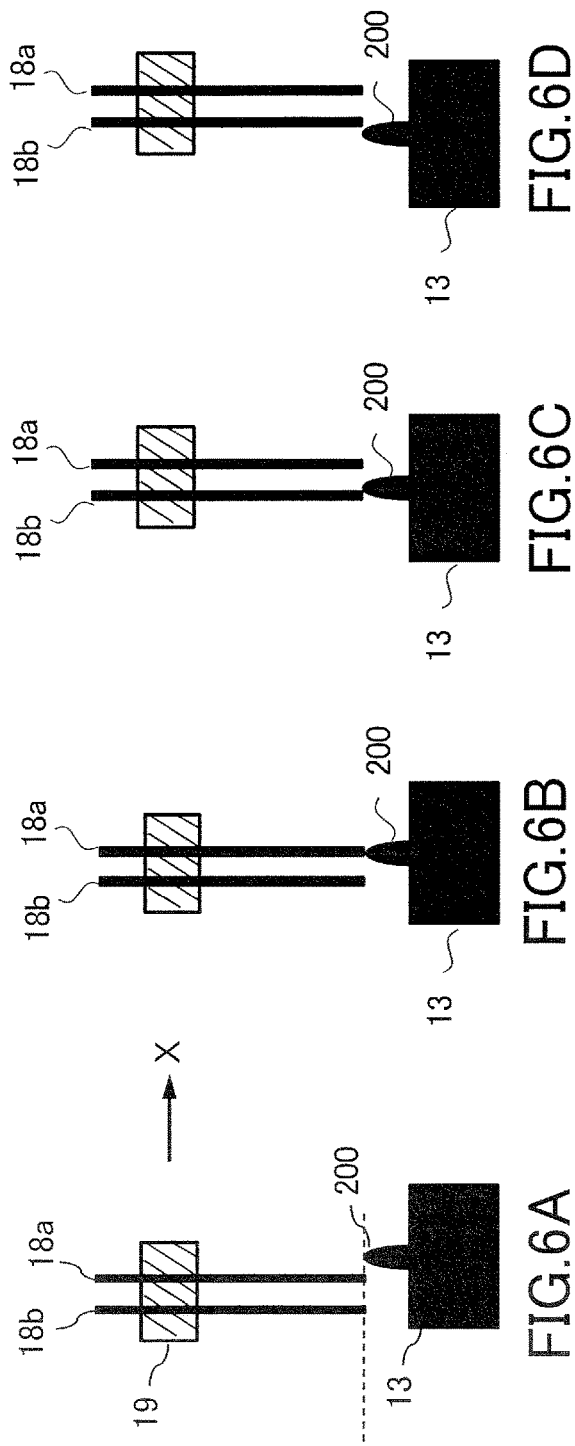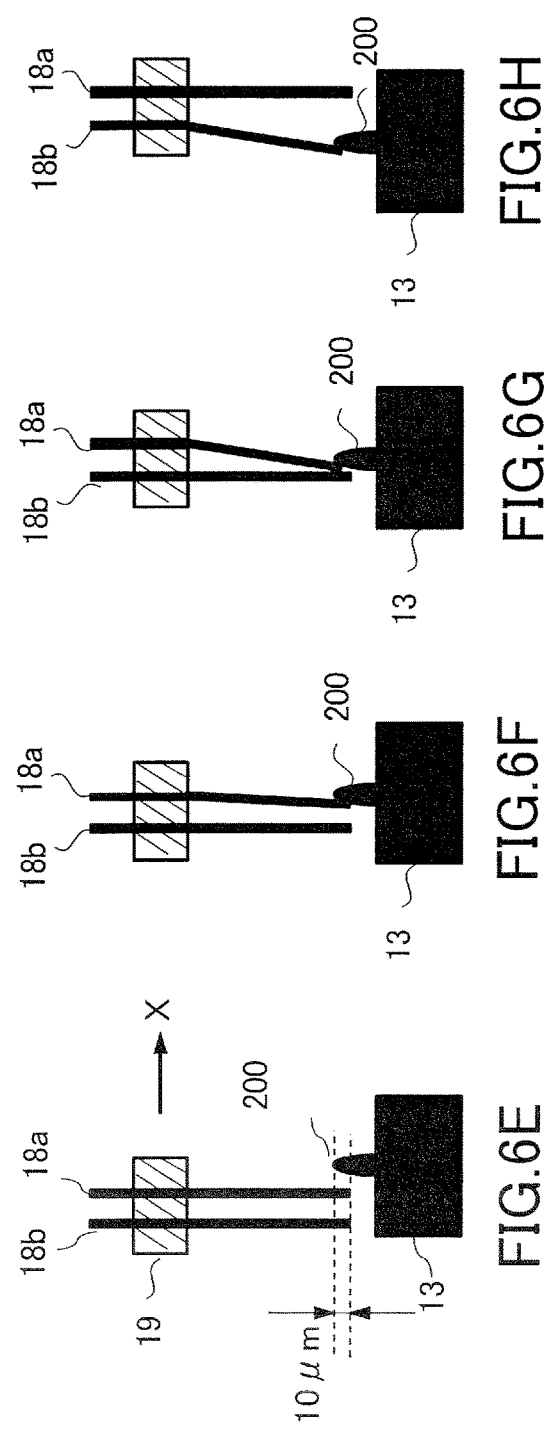

ADDITIVE MANUFACTURING APPARATUS AND METHOD FOR MANUFACTURING THREE-DIMENSIONALLY SHAPED OBJECT

BACKGROUND OF THE INVENTION

Field of the Invention

The present invention relates to a method for manufacturing a three-dimensionally shaped object using powder bed fusion, and an additive manufacturing apparatus used therefor.

Description of the Related Art

In recent years, so-called 3D printers are actively developed, and various methods have been attempted. For example, various methods such as fused deposition modeling, stereolithography using photocurable resin, and powder bed fusion are known.

Powder bed fusion is a method of forming a three-dimensionally shaped object by repetitively performing a step of laying a raw material powder such as metal into a layer shape and a fusion solidification step of radiating an energy beam such as a laser beam to selectively fuse and solidify part of the powder layer or a sintering solidification step of radiating an energy beam to selectively sinter part of the powder layer. In recent years, powder bed fusion using metal powder as a raw material has been started to be utilized as a method for manufacturing a product for which high mechanical strength and/or good thermal conductivity are demanded.

For example, PCT International Publication No. WO 2012/160811 proposes a manufacturing method for manufacturing a three-dimensionally shaped object by layering a raw material powder such as metal by using a squeegee blade and then radiating a laser beam.

Incidentally, in some cases, when selectively fusing part of a powder layer by radiating an energy beam to the powder layer, a projection portion, which is an unintentionally solidified portion having a projection shape, is formed as a result of part of a fused material scattering and attaching to the surface of a normally formed solidified layer or as a result of a fused matter not fusing into an already solidified lower layer. Such an unintentional projection portion sometimes projects from the outermost layer by several tens of micrometers to 300 µm in size.

In recent years, to increase the shape precision and density of the three-dimensionally shaped object, the thickness of each powder layer is set to about several tens of micrometers. However, in the case where the projection portion described above is generated, the height of the projection portion may be sometimes so large as to exceed the upper surface of a powder layer to be formed next. In this case, a flattening mechanism for flattening the surface of the powder layer mechanically interferes with the projection portion at the time of forming the next powder layer. In this case, the flattening mechanism is caught by the projection portion and the step of forming the powder layer is stopped, a blade of the flattening mechanism is damaged by the contact, or the shape precision of the three-dimensionally shaped object is degraded. Further, sometimes frictional load increases and the flattening mechanism stops, or the shaped object is broken when the impact is strong.

Japanese Patent Laid-Open No. 2004-277881 discloses a method of detecting the presence of a projection portion by change in the load on a driving motor of a flattening mechanism and a method of optically detecting the presence of a projection. Further, in the case where a projection portion is detected, a powder layer is formed after removing the projection portion.

However, the method for detecting a projection portion disclosed in Japanese Patent Laid-Open No. 2004-277881 is not necessarily a secure method.

First, since the method of detecting a projection portion by the change in the load on the driving motor is a method used when the flattening mechanism comes into contact with the projection portion, the blade of the flattening mechanism can be damaged by the contact in the case of using this method. When a powder layer is formed by a blade with a scratch, the powder layer has a protrusion corresponding to the scratch, the protrusion causes fusion deficiency of the powder layer, and therefore the shape precision of the three-dimensionally shaped object is degraded.

In addition, the projection portion does not have a regular shape and can have various shapes. However, according to the optical detection method using an image capturing apparatus disclosed in Japanese Patent Laid-Open No. 2004-277881, sufficient detection sensitivity cannot be achieved in some cases depending on the shape of the projection portion.

Therefore, a detection technique with which a projection portion can be reliably detected without damaging the flattening mechanism has been desired.

SUMMARY OF THE INVENTION

According to a first aspect of the present invention, an additive manufacturing apparatus includes a powder layer forming portion configured to form a powder layer in a predetermined region, an energy beam source configured to radiate an energy beam to the powder layer formed by the powder layer forming portion to fuse or sinter the powder layer so that a solidified layer is formed, and a contact detection sensor including a plate-like probe. Presence or absence of a projection portion on a surface of the solidified layer is detected by using the contact detection sensor.

According to a second aspect of the present invention, a method for manufacturing a three-dimensionally shaped object includes a powder layer forming step of forming and flattening a powder layer of a predetermined thickness in a predetermined region by using a powder layer forming portion, a solidification step of forming a solidified layer by radiating an energy beam to the powder layer flattened in the powder layer forming step, and a detection step of detecting, by using a contact detection sensor comprising a plate-like probe, whether or not a projection portion having a height that interferes with the powder layer forming portion in a case where the powder layer forming portion forms a powder layer of the predetermined thickness on the solidified layer is present on the solidified layer.

Further features of the present invention will become apparent from the following description of exemplary embodiments with reference to the attached drawings.

BRIEF DESCRIPTION OF THE DRAWINGS

FIG. 1 is a front view of an additive manufacturing apparatus of a first exemplary embodiment in which the inside thereof is seen through.

FIGS. 6A to 6H are each a diagram schematically illustrating difference of interference state derived from difference in relative positions between the projection portion detector and the projection portion.

FIG. 7 is a front view of an additive manufacturing apparatus of a third exemplary embodiment in which the inside thereof is seen through.

FIG. 9 is a front view of an additive manufacturing apparatus of a fourth exemplary embodiment in which the inside thereof is seen through.

FIG. 10 is a front view of an additive manufacturing apparatus of a fifth exemplary embodiment in which the inside thereof is seen through.

DESCRIPTION OF THE EMBODIMENTS

First Exemplary Embodiment

A method for manufacturing a three-dimensionally shaped object and an additive manufacturing apparatus serving as a first exemplary embodiment of the present invention will be described below with reference to drawings.

Figure 1:
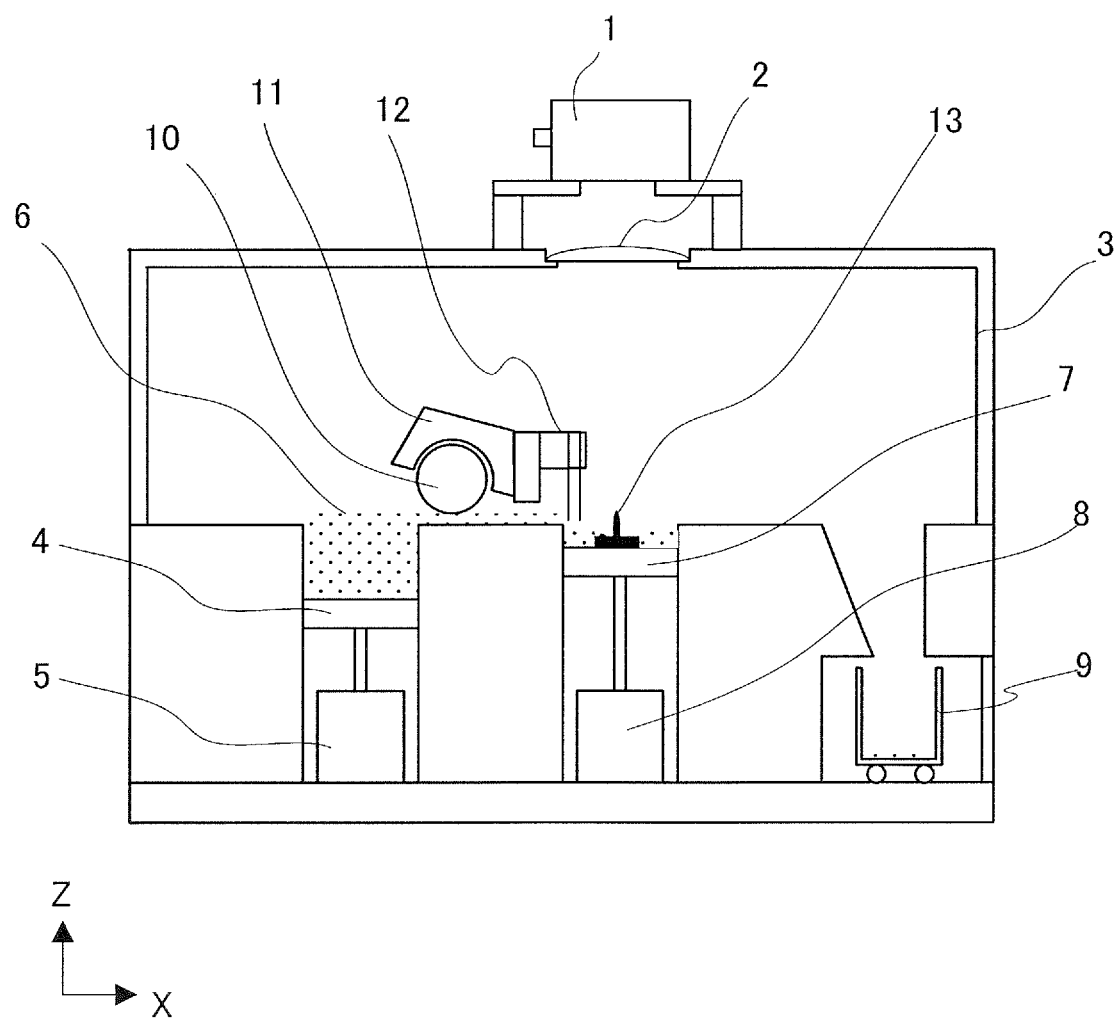

FIG. 1 is a schematic front view of the additive manufacturing apparatus of the first exemplary embodiment in which the inside thereof is seen through.

FIG. 1 illustrates a galvanoscanner 1, an f-θ lens 2, a chamber 3, a supply stage 4, a driving mechanism 5, a powder material 6, a shaping stage 7, a driving mechanism 8, a collection mechanism 9, a flattening mechanism 10, a positioning mechanism 11, a projection portion detector 12, and a shaped object 13. The galvanoscanner 1 performs scanning with a laser beam input from an unillustrated laser beam source through, for example, a fiber. The f-θ lens 2 focuses the laser beam output from the galvanoscanner 1 at a predetermined height above the shaping stage 7. The chamber 3 is provided for keeping an environment rich in an inert gas in a space where the three-dimensionally shaped object is shaped. The supply stage 4 is provided for supplying the powder material 6. The driving mechanism 5 drives the supply stage 4. The powder material 6 is placed on the supply stage 4. The shaping stage 7 serves as a base for supporting the shaped object. The shaped object is shaped on the shaping stage 7 by repetitively performing a process of laying the powder material on the shaping stage 7 to a predetermined thickness, fusing and solidifying the powder material by radiating a laser beam to a predetermined position, then lowering the position of the shaping stage 7 by an amount corresponding to the predetermined thickness, laying the powder material again, and causing the fusion and solidification by irradiation of the laser beam. The driving mechanism 8 drives the shaping stage 7. The collection mechanism 9 collects remainder of the powder material conveyed from the supply stage 4 to the shaping stage 7. The flattening mechanism 10 is a roller for flattening the surface of the powder material layer. The flattening mechanism 10 serving as a powder layer forming portion has a role of conveying the powder material 6 on the supply stage 4 to the shaping stage 7 and a role of flattening the surface of the powder layer on the shaping stage 7. The positioning mechanism 11 controls the height of the projection portion detector 12, and is mounted on an unillustrated carriage together with a roller. When the carriage moves, the roller and the positioning mechanism 11 integrally move. The projection portion detector 12 is mounted on the positioning mechanism 11. The shaped object 13 is formed by fusing and solidifying the powder material by laser irradiation. The projection portion detector 12 is disposed downstream of the flattening mechanism 10 serving as a powder layer forming portion in the movement direction of the carriage at the time of forming the powder layer.

As the projection portion detector 12, a method of mechanically bringing a plate-like probe in contact with a projection portion to detect the projection portion is practically reliable, and specifically a contact detection sensor including an elastic member such as a plate spring is preferably used.

Figure 2A:
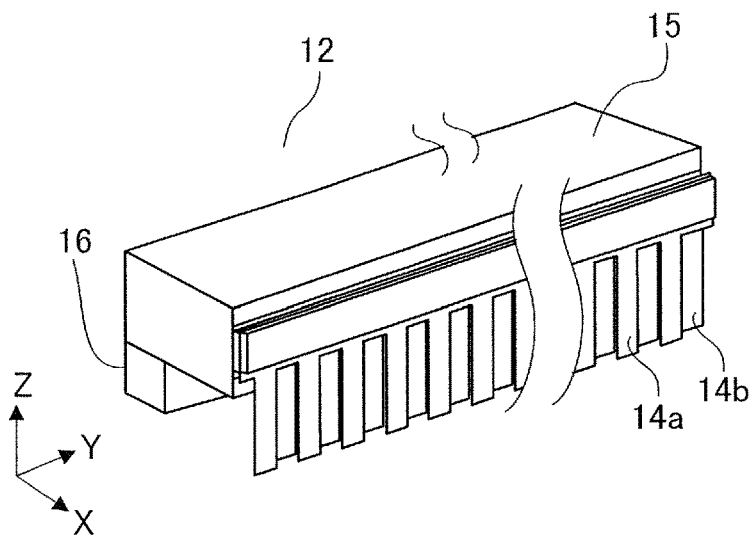
FIG. 2A is a perspective view of a projection portion detector including a plate-like probe of a first example.
Figure 2B:
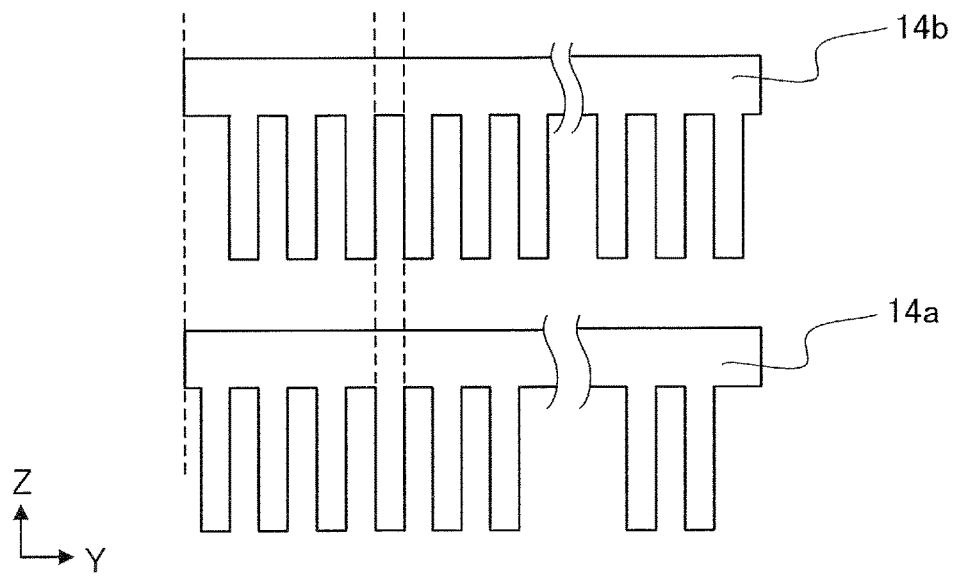
FIG. 2B is a diagram for describing pectinate arrangement of plate springs.
Figure 2C:
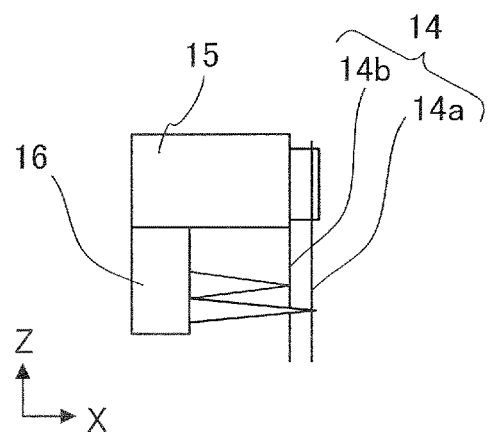
FIG. 2C is a side view of the projection portion detector of the first example.

As a first example of the plate-like probe, the projection portion detector 12 including plate spring groups in which rectangular plate springs are arranged into a pectinate shape will be described with reference to FIGS. 2A to 2C. FIG. 2A is an external perspective view of the projection portion detector 12 illustrating a configuration thereof, FIG. 2B is an exploded view of the projection portion detector 12 for describing the positional relationship between two plate spring groups in a Y direction, and FIG. 2C is a side view of the projection portion detector 12 for describing the configuration thereof. In the present exemplary embodiment, the plate spring groups of pectinate shapes are used for specifying not only the presence/absence but also the position of the projection portion.

Plate spring groups 14a and 14b are each a plate spring group in which rectangular plate springs are connected into a pectinate shape, and are provided so as to overlap with each other in the Y direction at different phases such that gaps between teeth of each pectinate shape overlap with teeth of the other plate spring group as illustrated in FIG. 2B.

It is preferable that the plate spring constituting each tooth of the pectinate shape is formed from a material having excellent spring characteristics such as phosphor bronze and has, for example, a rectangular shape having a width of 5 mm in the Y direction and an aspect ratio of 1:4 to 1:8. The aspect ratio used herein is a ratio of length in the Y direction: length in the Z direction. Although the resolution of detection of the position of the projection portion in the Y direction can be increased by setting the width in the Y direction to be small, processing and handling the plate spring becomes difficult in the case where the width in the Y direction is too small. In addition, in the case where the aspect ratio is set to be large, although the teeth becomes easier to deform when contacting the projection portion and therefore the detection sensitivity can be increased, processing and handling the plate spring becomes difficult in the case where the aspect ratio is too large. Therefore, the shape described above is preferably used.

The teeth of the pectinate shape are arranged in a length of, for example, 300 mm in the Y direction such that the projection portion detector 12 can cover the entirety of the powder layer formed by the flattening mechanism 10 in a predetermined region.

A line sensor 16 is fixed to a position opposing a plate spring band 14 via a fixing member 15. The line sensor 16 is an optical sensor including a light source having a linear shape and a group of light receiving elements arranged in a linear shape. In the case where the plate springs are not deformed, most of the light from the light source is reflected by the plate springs and incident on the light receiving elements. However, in the case where a plate spring comes into contact with the projection portion and is deformed, the direction of reflection changes, and thus the amount of light received by a light receiving element at a position opposing the plate spring changes greatly. As a result of this, contact between the plate spring and the projection portion can be detected. By analyzing for which of the light receiving elements the amount of received light has changed, the position of the projection portion in the width direction of the plate spring groups can be detected.

Next, the projection portion detector 12 including a plurality of plate spring pairs serving as a second example of the plate-like probe will be described with reference to FIGS. 3A to 3C.

Figure 3A:
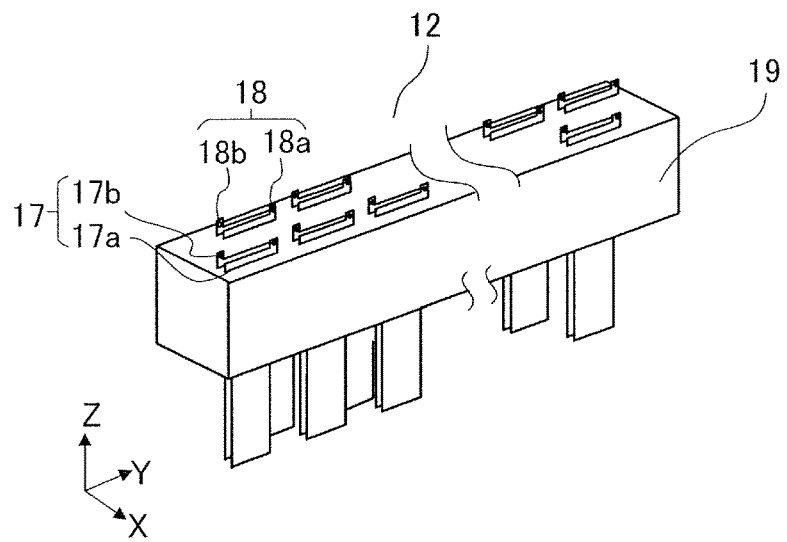
FIG. 3A is a perspective view of a projection portion detector including a plate-like probe of a second example.
Figure 3B:
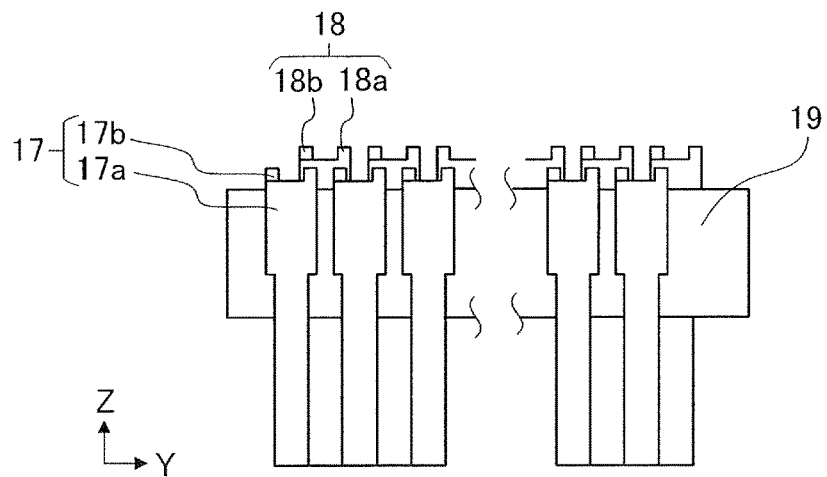
FIG. 3B is a diagram for describing arrangement of plate spring pairs.
Figure 3C:
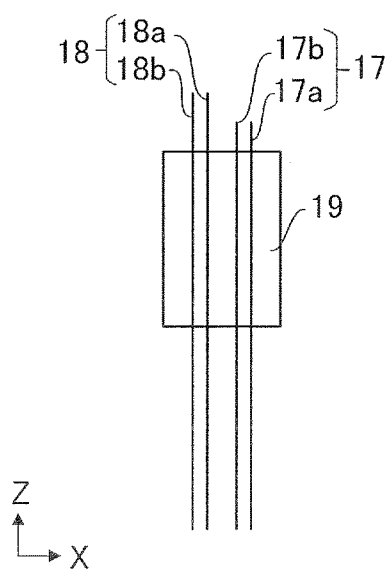
FIG. 3C is a side view of the projection portion detector of the second example.

FIG. 3A is an external perspective view of the projection portion detector 12 illustrating a configuration thereof, FIG. 3B is a section view of the projection portion detector 12 for describing the positional relationship of the plate spring pairs in the Y direction, and FIG. 3C is a section view of the projection portion detector 12 illustrating a configuration thereof.

Plate spring pairs 17 are each formed by arranging a pair of a plate spring 17a and a plate spring 17b having the same shape in opposition to each other in an overlapping manner with a predetermined interval therebetween, and plate spring pairs 18 are each formed by arranging a pair of a plate spring 18a and a plate spring 18b having the same shape in opposition to each other in an overlapping manner with a predetermined interval therebetween.

As illustrated in FIGS. 3A and 3B, the plurality of plate spring pairs 17 are arranged along a predetermined direction, a Y direction in this case, at intervals equal to the width of the plate spring. Similarly, the plurality of plate spring pairs 18 are arranged along the Y direction at intervals equal to the width of the plate spring. The plate spring pairs 17 and the plate spring pairs 18 are arranged between the other group of the plate spring pairs as viewed in an X direction such that the plate spring pairs 17 and the plate spring pairs 18 do not overlap with each other as viewed in the X direction.

A fixing member 19 that fixes the plate springs 17a, 17b, 18a, and 18b is formed from a non-conductive material. Each plate spring is connected to unillustrated wiring, and the wiring is connected to a conduction sensor that detects electrical conduction between plate springs of each plate spring pair.

The plate spring pairs are arranged in the Y direction in a length of, for example, 300 mm, such that the projection portion detector 12 can cover the entirety of the powder layer formed by the flattening mechanism 10 in a predetermined region.

In the case where no plate spring is deformed, the plate spring 17a and the plate spring 17b are not mechanically in contact with each other, and are therefore electrically insulated. The same applies to the plate springs 18a and 18b. However, when a plate spring comes into contact with the projection portion and is deformed while moving the projection portion detector 12, the plate spring comes into contact with the other plate spring of the pair, and thus the plate spring pair is electrically connected. Therefore, the contact with the projection portion can be detected by the conduction sensor. By analyzing in which of the plate spring pairs the electrical conduction has occurred, the position of the projection portion in the Y direction can be detected.

Here, setting of the height of the lower end of the plate springs and detection of contact will be described in detail. If the lower end of the plate springs is at the same height as the distal end of the projection portion, although a plate spring can come into contact with the projection portion, the plate spring and the projection portion are separated without interfering with each other due to the movement of the carriage in the X direction, and therefore the plate spring is not deformed. In contrast, in the case where the height of the projection portion is higher than the lower end of the plate springs, the plate spring is deformed by the movement of the carriage in the X direction in accordance with the length of an interfering part.

Since the plate spring pairs 17 and 18 each have the same moving mechanism, description will be given on the plate spring pairs 18 herein with reference to FIGS. 6A to 6H. Each diagram illustrates the shaped object 13 solidified in a normal shape by laser irradiation, and an abnormal projection portion 200 that has been formed together with the shaped object 13. The plate springs 18a and 18b are held by the fixing member 19. As an example, a case where the plate springs 18a and 18b are fixed to the fixing member 19 such that the length of each plate spring from the fixing member 19 to the distal end thereof is 20 mm, and the distance between the plate springs 18a and 18b is 0.5 mm will be described. The projection portion detector including these plate springs are mounted on an unillustrated carriage, and is moved in the X direction in the drawings.

First, a case where lower end of the plate springs is at the same height as the distal end of the projection portion will be described with reference to FIGS. 6A to 6D. FIG. 6A illustrates a state in the middle of movement of the carriage in the X direction in which the plate spring 18a has approached the projection portion 200 generated on the shaped object 13. The dotted line indicates the lower end of the plate springs 18a and 18b and the height of the distal end of the projection portion 200, which coincide with each other. FIG. 6B illustrates a state in which the carriage has then moved a little and the plate spring 18a has moved to a position right above the projection portion 200. In the state of FIG. 6B, although the plate spring 18a and the projection portion 200 are in contact, these two do not interfere with each other in the positional relationship thereof, and therefore the plate spring 18a is not deformed. When the carriage further moves in the X direction, the plate spring 18a moves away from the projection portion 200 while maintaining a straight shape as illustrated in FIGS. 6C and 6D, and no conduction between the plate springs 18a and 18b occur as a result.

Next, a case where the projection portion and the plate spring interfere with each other by a height of 10 μm will be described with reference to FIGS. 6E to 6H. FIG. 6E illustrates a state in the middle of movement of the carriage in the X direction in which the plate spring 18a has approached the projection portion 200 generated on the shaped object 13. Two dot lines respectively indicate the lower end of the plate springs 18a and 18b and the height of the distal end of the projection portion 200, and the distance therebetween is 10 μm. FIG. 6F illustrates a state in which the carriage has then moved in the X direction from the state of FIG. 6E and the plate spring 18a has moved to a position right above the projection portion 200. The plate spring 18a interferes with the projection portion 200, and is warped. When the carriage moves further in the X direction, the plate springs 18a and 18b come into contact as illustrated in FIG. 6G. When the carriage is moved further in the X direction, the interference between the lower end of the plate spring 18a and the projection portion 200 is released, the plate spring 18a returns to the original straight state, and the contact between the plate springs 18a and 18b is cancelled. Although the plate spring 18b interferes with the projection portion 200 thereafter as illustrated in FIG. 6H, the plate springs 18a and the 18b does not come into contact with each other.

In this exemplary embodiment in which the length of the plate spring 18a is 20 mm and the length of the portion interfering with the projection portion is 10 µm in the Z direction, the plate spring 18a interferes with and is deformed by the projection portion until the movement amount of the carriage in the X direction from the position at which the plate spring 18a comes into contact with the projection portion is about 0.63 mm as calculated by trigonometry. Further, since the distance between the plate springs 18a and 18b is set to 0.5 mm, the plate springs 18a and 18b come into contact with each other, and thus the contact can be detected.

Generally, the shaping stage 7 and the flattening mechanism 10 that is a roller are manufactured to have a very high rigidity in the Z direction such that the powder material can be laid smoothly and to a uniform thickness, and therefore the roller can be damaged by just small interference. That is, in the case where the height of the roller and the height of the distal ends of the plate springs are set to the same value, there is a possibility that the roller is damaged by a projection portion that has not been detected by the projection portion detector, which is a projection portion whose distal end has the same height as the lower end of the plate springs, while laying the powder material. To detect such a projection portion, the distal ends of the plate springs of the projection portion detector need to be set to be lower than the lower end of the roller.

Next, among a series of shaping operations performed by the additive manufacturing apparatus of the present exemplary embodiment illustrated in FIG. 1, a powder layer forming operation will be described. FIGS. 4A to 4J are each a diagram schematically illustrating each step after radiating a laser beam 39 to part of a powder layer on the shaping stage 7 to fuse or sinter part of the powder layer and before laminating the next powder layer. An unillustrated shaping plate may be placed on the shaping stage 7, and the powder layer may be formed on the shaping plate. In the present description, part of the powder layer fused and then solidified, or sintered will be referred to as a solidified layer. In addition, although a case where the powder layer is fused and solidified will be described as an example in the present exemplary embodiment, the same applies to a sintered layer.

Figure 4A:
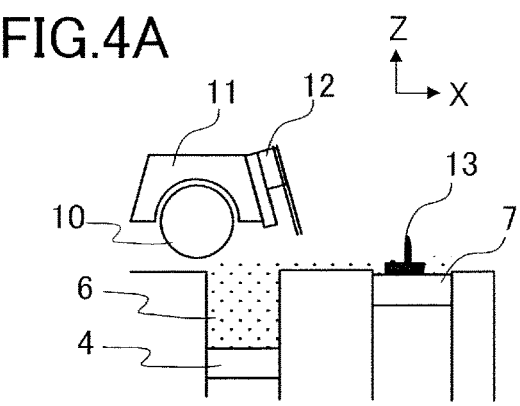
FIGS. 4A to 4J are each a diagram schematically illustrating each step after solidifying part of a powder layer and before laminating the next powder layer.

First, FIG. 4A illustrates a state after part of the powder layer on the shaping stage 7 is fused and solidified by being irradiated with a laser beam. The shaped object is manufactured by forming solidified objects by sequentially forming the next powder layer and radiating a laser beam in this state. FIG. 4A illustrates a state in which a projection portion is formed on a part of the shaped object 13 when the powder material is fused and solidified by the irradiation of laser beam.

Figure 4F:
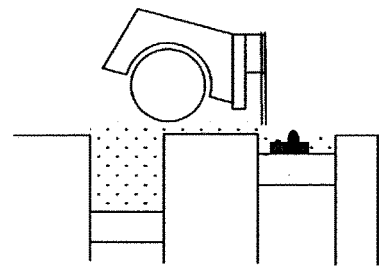
Figure 4B:
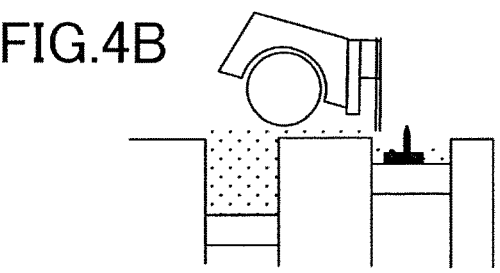
Figure 4G:
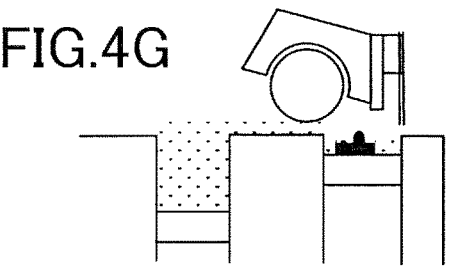

FIG. 4B illustrates a state in which the height of the shaping stage 7 is lowered by an amount corresponding to the thickness t, whose unit can be arbitrarily selected, of one layer for preparation for the formation of the next powder layer, and then the carriage is moved toward the shaping stage 7 and the height of the lower end of plate springs of the projection portion detector 12 is adjusted to a measurement height above the shaping stage 7 by the positioning mechanism 11. The measurement height of the projection portion detector 12 is adjusted to such a height that, for example, the lowest end of the plate spring pairs 18 of the projection portion detector 12 is 10 µm lower than the lowest end of the roller of the flattening mechanism 10. By adjusting the height to this value, an unintended projection portion of a height that can interfere with the roller can be reliably detected. In the case of using the projection portion detector 12 illustrated in FIG. 3, the presence/absence of the unintended projection portion is detected by the presence/absence of electrical conduction between the plate spring pair 18. The plate springs 18a and 18b are, for example, a pair of springs each having a shape of a width of 5 mm and an effective length of 20 mm, and therefore the resolution of detection of the position of the projection portion in the Y direction is 5 mm in this case.

Figure 4C:
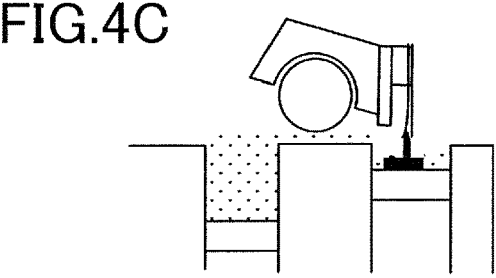

Next, the presence/absence of the projection portion is determined while moving the projection portion detector 12 including a plate-like probe in the X direction as illustrated in FIG. 4C. In the case of using the plate-like probe of the first example, if there is a projection portion, the plate spring band having pectinate shape is deformed by the contact with the projection portion, the deformation is detected by a line sensor, and thus it is determined that there is a projection portion. Regarding the position of the projection portion, the X coordinate thereof is specified by how much the carriage has been moved, that is, by the scanning position of the plate-like probe, and the Y coordinate thereof is specified on the basis of for which of the plate springs serving as teeth the deformation has been detected.

In the case where the projection portion is detected, in order to grasp the height of the projection portion, the presence/absence and the position of the projection portion may be specified by lowering the height of the shaping stage 7 by a certain amount t and performing scanning by the projection portion detector 12 in the X direction again in this state. If the projection portion is not detected at a position where the projection portion has been detected previously, the height of the projection portion can be obtained as being t or larger and smaller than 2×t with respect to the surface of the powder layer at the time of the previous laser irradiation. In addition, in the case where the projection portion is detected at the position where the projection portion has been detected previously, the operation of further lowering the height of the shaping stage 7 by a certain amount t and performing scanning by the projection portion detector 12 is repeated until the deformation of the plate spring pair 18 caused by the contact with the projection portion is no longer detected. The height of the projection portion is derived as a value between the accumulated value of the movement amount of the shaping stage 7 in the Z direction until the deformation of the plate spring pair 18 is no longer detected and a value obtained by subtracting the certain amount t from the accumulated value.

Although the movement amount of the shaping stage in each detection of the projection portion is set to be equal to the thickness t of one powder layer, this value can be appropriately increased or reduced.

In addition, although the roller serving as the flattening mechanism and the projection portion detector are mounted and moved on the same carriage, these may be each mounted on a different carriage. In this case, the roller does not have to be moved when detecting the projection portion, and therefore there is a merit that the risk of the projection portion and the roller colliding is eliminated. However, in the case where these are mounted on different carriages, controlling the positions of the roller and the projection portion detector in the Z direction in the order of micrometers in the entirety of the operation range requires very high costs for guiding and the like, and there is a risk that the positions change over time due to the rigidity of the parts or the like. Therefore, mounting the flattening mechanism 10 and the projection portion detector 12 on the same carriage is more advantageous because the relative positions of the roller and the projection portion detector are easier to control and the configuration of the apparatus is simpler.

Figure 4H:
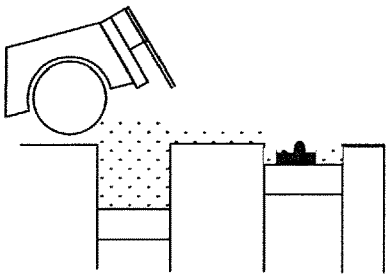
Figure 4D:
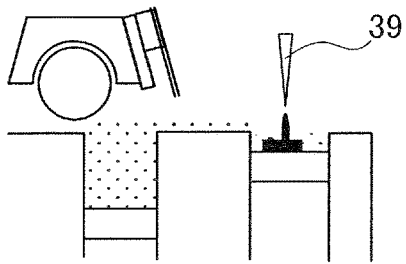

In the case where the projection portion is detected, the flattening mechanism 10 and the projection portion detector 12 are temporarily retracted as illustrated in FIG. 4D, and the projection portion whose position has been specified is removed. Alternatively, shaping is performed by laying the powder material such that the surface of the powder layer is higher than the height of the projection portion. Although the removal of projection portion is preferably performed by irradiation of laser beam, the removal of projection portion may be performed by a cutting tool mounted on the apparatus.

Figure 4I:
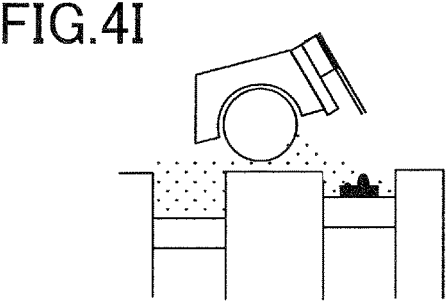
Figure 4E:
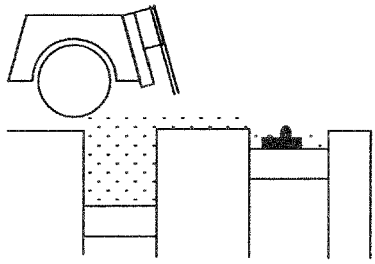

FIG. 4E illustrates a state in which the projection portion is fused by using a laser beam, and thus a portion having a height that can interfere with the roller of the flattening mechanism 10 is removed.

After the irradiation of laser beam, as illustrated in FIG. 4F, the projection portion detector 12 is reset and scanning movement of the carriage is performed, to inspect whether there is another projection portion. In the case where another projection portion is detected, the operations of FIGS. 4C to 4F are performed, and the part of the projection portion having a height that can interfere with the roller is removed.

Then, in the case where the scanning is performed to a coordinate of the opposite side of the shaping stage without detecting the projection portion, it is determined that there is no projection portion having a height that can interfere with the roller, and the process proceeds to a powder layer forming step.

In the case where it is confirmed that there is no projection portion, as illustrated in FIG. 4H, the flattening mechanism 10 is moved back to a position exceeding the supply stage 4 by the carriage, the supply stage 4 is lifted by a certain amount, and thus the powder material is pushed up.

Then, as illustrated in FIG. 4I, the flattening mechanism 10 is moved toward the shaping stage 7, and thus the powder material is moved to the shaping stage 7. Further, the roller of the flattening mechanism 10 passes above the shaping stage 7, and therefore the powder material that has been conveyed is accumulated on the shaping stage 7.

Figure 4J:
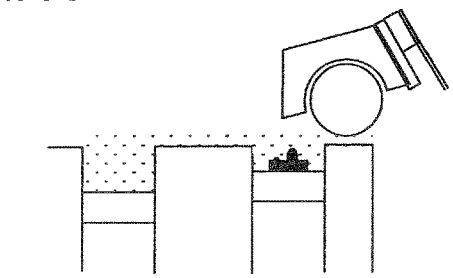

The powder material is leveled by the roller, therefore the upper surface of the powder material conveyed to the shaping stage 7 is flattened as illustrated in FIG. 4J, and thus a powder layer having a flat upper surface is formed.

By the series of operations described above, detection and removal of the projection portion and formation of the powder layer is performed. Since the projection portion detector 12 illustrated in FIGS. 2A to 2C or 3A to 3C is used in the present exemplary embodiment, the position of the projection portion on the shaping stage can be detected, and therefore the removal operation can be performed efficiently.

How the position of the projection portion on the shaping stage 7 is obtained will be described in detail with reference to FIG. 5.

Figure 5:
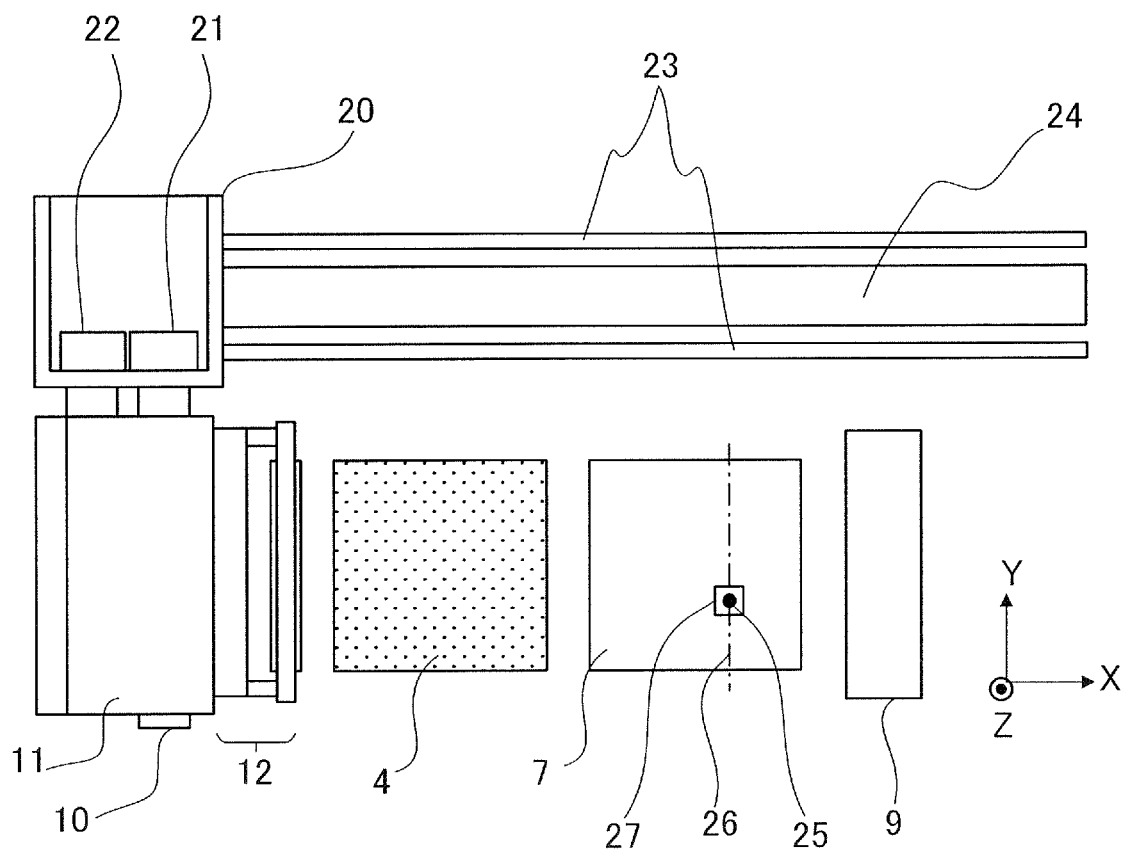
FIG. 5 is a plan view of the additive manufacturing apparatus of the first exemplary embodiment.

FIG. 5 is a plan view of the additive manufacturing apparatus of the present exemplary embodiment as viewed from above. The flattening mechanism 10, the projection portion detector 12, a carriage 20 that performs scanning movement of these, the supply stage 4, and the shaping stage 7 are illustrated. Further, FIG. 5 illustrates a motor 21 that rotates the roller of the flattening mechanism 10, a driving portion 22 of the positioning mechanism 11 that adjusts the height of the projection portion detector 12, a guide 23 that restricts the movement of the carriage 20 in the Y direction and the Z direction, a driving portion 24 that has a position control function of controlling the carriage in the X direction, and a projection portion 25 formed above the shaping stage 7.

In the projection portion detector 12, plate-like probes of predetermined widths, that is, plate springs are arranged along the Y direction as described with reference to FIGS. 2A to 2C or 3A to 3C. Plate springs of a required number are arranged such that the entire width of the shaping stage 7 in the Y direction can be inspected. The resolution of detection of abnormal object in the Y direction is determined by the width of each plate spring in the Y direction.

When the carriage is driven in the X direction and the projection portion detector 12 reaches an end of the shaping stage 7, the height of the lower end of the plate springs of the projection portion detector 12 is adjusted. That is, the height of the lower end is adjusted to such a height that the lower end does not come into contact with the powder layer formed by the flattening mechanism 10 and the three-dimensionally shaped object of a normal shape formed by fusing and solidifying the powder layer, but comes into contact with a projection portion projected with respect to these.

Then, the shaping stage is scanned by the projection portion detector 12 by driving the carriage 20. In the case where the projection portion 25 is detected, the position thereof in the X direction can be obtained from the position of the carriage 20 at the time of detection, and the position thereof in the Y direction is obtained from by which of the plate springs the projection portion 25 is detected.

In the case where it is confirmed that a projection portion is present in a region 27 illustrated in FIG. 5 and corresponding to the position detection resolution of the projection portion detector 12, the projection portion can be removed efficiently by using a laser beam or moving a cutting tool in this region. To be noted, although the height in the Z direction needs to be set in the case of removing the projection portion by a cutting tool, the height of the cutting tool may be set to be equal to the height of the lowest point of the plate springs at the time of performing a detection operation by the projection portion detector 12. To be noted, in the case where the projection portion detector 12 detects a projection portion, the removal operation may be performed by focusing only on the position in the X direction and moving the laser beam or the cutting tool at the obtained X coordinate, that is, on a line 26 illustrated in FIG. 5 by an amount corresponding to the width of the shaping stage 7 along the Y direction.

Next, removal of a projection portion using a laser beam will be described in further detail.

For example, a case where shaping is performed by using SUS316 having a median particle diameter of 20 μm and a projection portion having a height of 30 µm or larger and smaller than 60 µm is detected at coordinates (X1, Y1) is assumed and will be described.

The region including the projection portion is scanned and irradiated with a laser beam. In the Y direction, the region is set as a range about three times as large as the resolution, for example, in the case where the resolution is 5 mm, a range of 15 mm or smaller including the both adjacent plate springs. In the X direction, the region is set in a range of, for example, 3 mm to 15 mm, depending of the detection precision.

Further, the irradiation is performed in a condition of a higher energy density than the laser power used for shaping the shaped object. For example, the irradiation is performed at a laser power of 60 W, which is a shaping condition for a case where the thickness of the powder layer is 60 µm. The irradiation is performed at a laser scanning speed of, for example, 250 mm/s in the X direction, and at a pitch of, for example, 50 µm in the Y direction.

Next, scanning is performed by the projection portion detector to check whether or not the projection portion is removed.

Here, the reason why the laser irradiation is performed in a condition of a high energy density to remove the projection portion is to make sure that the projection portion fuses because the projection portion is formed by once fusing and solidifying the powder material, and therefore has a higher thermal conductivity than the powder layer and the temperature thereof is less easily raised. In addition, the reason why the fusing region is set to be larger than the region including the projection portion is to cause the projection portion to fuse into the solidified layer by also fusing the surface that has been already fused and solidified around the projection portion. In the case where only the projection portion is fused, the fused projection portion forms a spherical shape due to the surface tension and often solidifies in this shape to remain on the surface.

In the case where the projection portion is still detected after the laser irradiation described above, laser irradiation is performed in the same area or an area appropriately expanded in the X direction in a shaping condition for a thicker powder layer, that is, a condition of a higher energy density, until the projection portion is removed.

When a projection portion is detected, the projection portion can be also removed by performing laser irradiation in the entire region that has been fused and solidified by laser irradiation immediately previously. However, locally performing laser scanning irradiation at and around the position of the detected projection portion is more advantageous from both perspectives of costs and functions because this requires a shorter irradiation time and because a smaller portion is heated and thus occurrence of distortion can be suppressed.

In addition, it is preferable that the resolution in the Y direction is increased by reducing the width of the plate springs, for reducing the irradiation area for removing the projection portion. In addition, it is preferable that the resolution in the X direction is increased by lowering the scanning speed for searching for the projection portion.

Removal by cutting may be applied to mechanical removal of projection. To be noted, although the removal by laser can be performed by an energy beam such as a laser beam that is a necessary element of the additive manufacturing apparatus, an additional device is needed for the mechanical removal. In addition, although the removal by an energy beam causes distortion due to thermal history, the removal by an energy beam is particularly suitable for a material having low ductility such as ceramics because mechanical collision at the time of processing or the like does not occur.

Meanwhile, by the mechanical removal, a projection on the trajectory of the tool can be reliably removed, thus the next layer can be formed without requiring a step of checking whether or not the projection has been removed unlike the removal by an energy beam, and therefore the mechanical removal is advantageous in terms of reliability.

Although a method of removing, by laser irradiation, an unintended projection, or a projection portion, that is generated during shaping has been described above, the projection portion detector is also beneficial for the mechanical removal such as cutting because the position of the projection can be detected and the tool can quickly access and remove the projection.

As described above, a projection portion detector including a plate-like probe is provided, and thus the presence/absence of a projection portion is checked before forming the powder layer. By using the plate-like probe, the projection portion can be detected with high reliability, and also position information of the projection portion can be obtained. In the case where a projection portion is detected, by forming the powder layer after removing the projection portion, the contact between the flattening mechanism and the projection portion can be avoided, stop of flattening and damages on the flattening mechanism can be prevented, the additive manufacturing operation can be stabilized, and thus the shape precision of the shaped object can be improved.

Second Exemplary Embodiment

Although a method of removing a projection portion in the case where a projection portion is detected has been described in the first exemplary embodiment, a method of performing shaping by laying the powder material such that the surface of the powder layer to be laid next is equal to or higher than the height of the projection in the case where a projection portion is detected will be described in the second exemplary embodiment. In addition, although a case where the powder material is fused and solidified will be described as an example in the present exemplary embodiment, the same applies to a case where the powder material is sintered.

In the case where a projection of a height equal to or larger than the thickness of one powder layer is detected, shaping can be performed by laying the powder material such that the surface of the powder layer is at the same height as or higher than the projection, to perform shaping without hitting the projection with the flattening mechanism. A method for this will be described with reference to FIGS. 11A to 11H.

FIGS. 11A to 11H are each a diagram schematically illustrating each step after fusing and solidifying part of the powder layer, and elements common to the first exemplary embodiment are denoted by the same numerals.

First, a laser irradiation condition corresponding to the thickness of the powder layer with which good shaping can be performed is obtained in advance. Requirement for manufacturing a shaped object is that an already solidified part that is under the powder layer to be fused is also fused to some extent when fusing the powder layer such that the already solidified part is fused and solidified together with the newly fused layer.

Since energy input to an irradiation position is proportional to the laser power and inversely proportional to the scanning speed, the energy input to an irradiation position is proportional to the energy density defined by laser power

[W]/scanning speed [mm/sec]. Therefore, by appropriately setting the power and scanning speed of the laser beam, the fusion and solidification of the powder layer and the already solidified portion thereunder can be controlled.

Further, in the laser irradiation, the power density, that is, irradiation power per unit area varies depending on the position within the beam diameter in the irradiation position. Specifically, the power is the strongest at the center of the irradiation beam, which follows a Gaussian distribution and is maintained after passing through the f-θ lens. When the power density is increased, the temperature of the irradiated portion is increased in accordance with the power density. However, if the power density is too high, the irradiated portion is heated depending on the scanning speed and the limitation of heat dissipation by heat transmission, thus evaporation of the material and scattering of powder increases, and good shaping cannot be performed. Therefore, if the peak power density of the irradiation beam can be reduced without changing the power itself, fusion and solidification at a larger depth from the surface or a larger area can be controlled without increasing the evaporation of the material or the scattering of powder.

Figure 12:
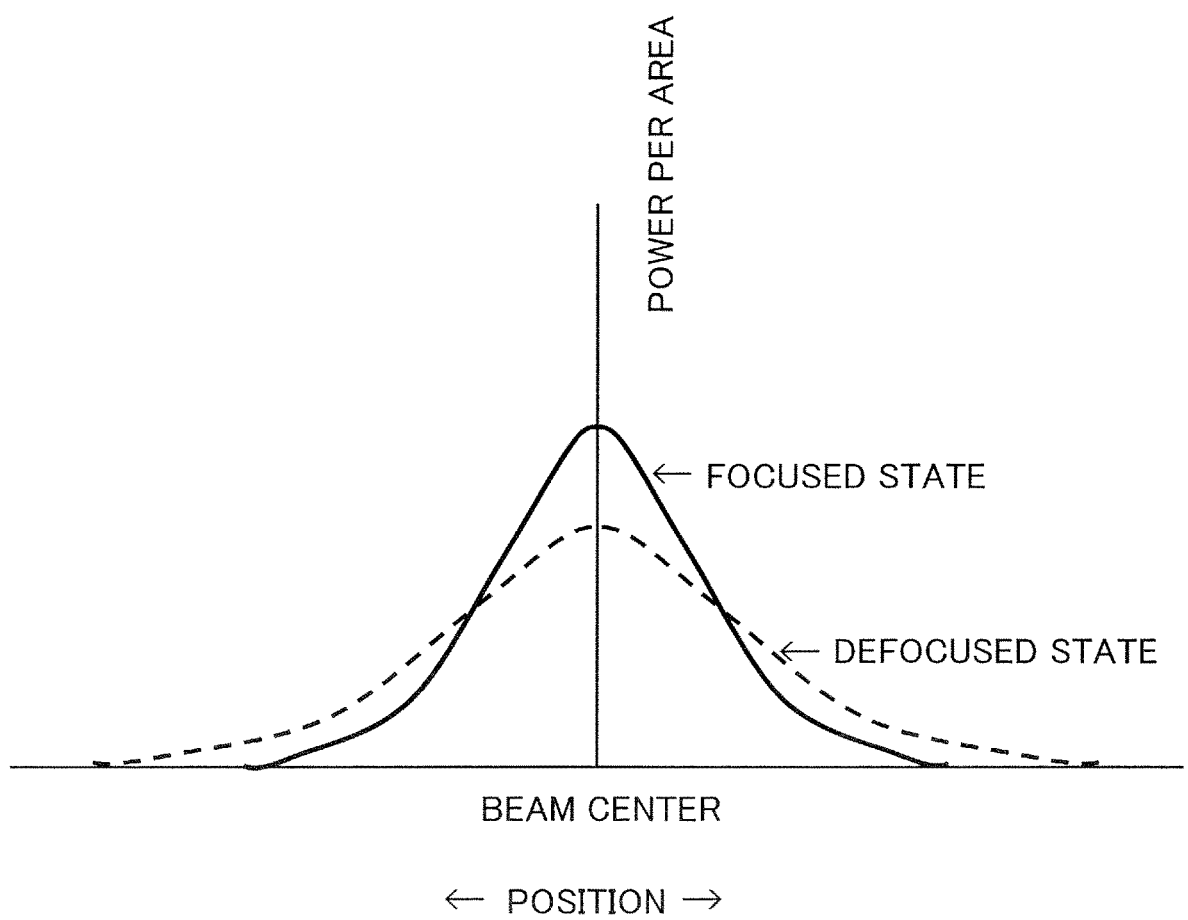
FIG. 12 is a diagram for describing difference in power density depending on the focus of a laser beam.

One example of such a method is defocusing. Defocusing refers to displacing the powder layer from the focus position where the irradiation beam diameter is the smallest by the f-θ lens in the Z direction. The outline of the defocusing will be described with reference to FIG. 12. The vertical axis represents the power density, the horizontal axis represents the spatial position, and the center of the beam diameter is matched with the position of the vertical axis. A solid curve two-dimensionally expresses the spatial distribution of the power density at the focus position at which the beam diameter is the smallest, and a dotted curve two-dimensionally expresses the spatial distribution when the defocusing is performed. The spatial region indicated by the horizontal axis where the power density is obtained is expanded and the peak power density is reduced when the defocusing is performed.

In this state, the total power is the same, and the quantity of applied heat is the same. Therefore, in the case where the evaporation of the material or scattering of powder is caused by an excessive peak power, the shaping can be improved in some cases by performing the defocusing. The fusing region at the time of irradiation can be expanded by lowering the peak power density of the same laser power by defocusing or also increasing the laser power. Therefore, the defocusing can be advantageous when the thickness of the powder layer is larger. However, since the defocusing increases the irradiation beam diameter, there is a disadvantage that the fineness of the shaping is degraded when defocusing is used.

A laser irradiation condition that allows good shaping is obtained in consideration of these by experiments or the like in advance. Typically, when the thickness is larger, the amount of powder to be fused is larger, and therefore the energy to be input per unit area and per unit time is increased. Since an already solidified portion right under the powder layer needs to be also fused to perform shaping, the input energy required for shaping is not proportional to the thickness of the powder layer.

Next, a powder layer forming operation among the series of shaping operations performed by the additive manufacturing apparatus of the present exemplary embodiment will be described. FIGS. 11A to 11H are each a diagram schematically illustrating each step after fusing and solidifying part of the powder layer on the shaping stage 7 by radiating a laser beam to the part of the powder layer and before laminating the next powder layer. A shaping plate 109 may be placed on the shaping stage 7 and the powder layer may be formed on the shaping plate 109. In the present exemplary embodiment, a case where the powder layer is formed on the shaping plate 109 will be described.

Figure 11A:
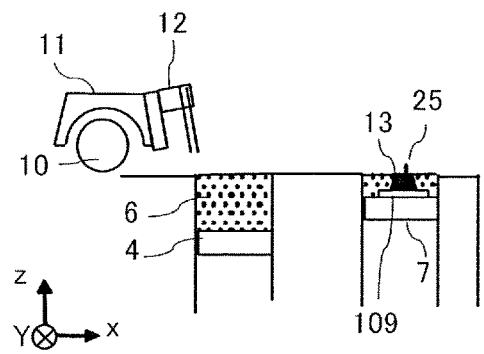
FIGS. 11A to 11H are each a diagram for schematically describing a second exemplary embodiment.

First, FIG. 11A illustrates a state after a laser beam is irradiated to part of the powder layer on the shaping plate 109 and the part of the powder layer is fused and solidified. The shaped object is manufactured by further layering solidified layer thereon by continuously forming the next powder layer and radiating a laser beam from this state. FIG. 11A illustrates a state in which the projection portion 25 is formed together with the shaped object 13 when the powder material is fused and solidified by the laser irradiation.

Figure 11B:
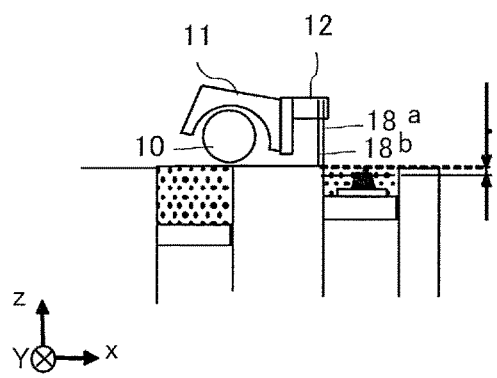

FIG. 11B illustrates a state in which the height of the shaping stage 7 is lowered by an amount corresponding to the thickness t, whose unit can be arbitrarily selected, of one layer for preparation for the formation of the next powder layer, and then the carriage is moved toward the shaping stage 7 and the height of the lower end of plate springs of the projection portion detector 12 is adjusted to a measurement height above the shaping stage 7 by the positioning mechanism 11. The measurement height of the projection portion detector 12 is adjusted to such a height that, for example, the lowest end of the plate spring pairs 18 of the projection portion detector 12 is 10 μm lower than the lowest end of the roller of the flattening mechanism 10. By adjusting the height to this value, an unintended projection portion of a height that can interfere with the roller can be reliably detected. In the case of using the projection portion detector 12 illustrated in FIG. 3, the presence/absence of the unintended projection portion is detected by the presence/absence of electrical conduction between the plate spring pair 18. The plate springs 18a and 18b are, for example, a pair of springs each having a shape of a width of 5 mm and an effective length of 20 mm, and therefore the resolution of detection of the position of the projection portion in the Y direction is 5 mm in this case.

Figure 11C:
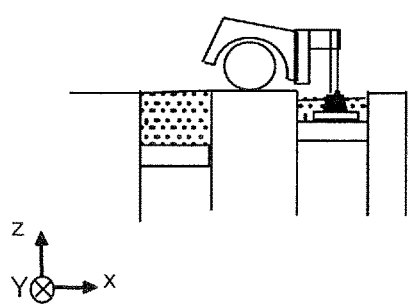
Figure 11D:
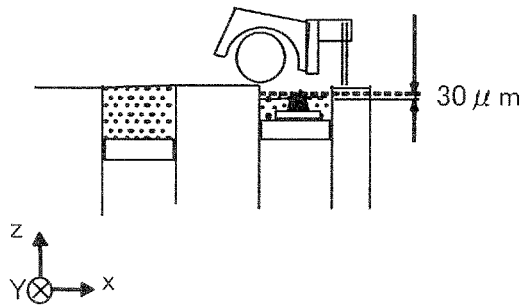

Next, the presence/absence of the projection portion is determined while moving the projection portion detector 12 including a plate-like probe in the X direction as illustrated in FIG. 11C. In the case of using the plate-like probe of the first example, if there is a projection portion, the plate spring bands having pectinate shapes are deformed by the contact with the projection portion, the deformation is detected by a line sensor, and thus it is determined that there is a projection portion. Regarding the position of the projection portion, the X coordinate thereof is specified by how much the carriage has been moved, that is, by the scanning position of the plate-like probe, and the Y coordinate thereof is specified on the basis of for which of the plate springs serving as teeth the deformation has been detected.

In the case where the projection portion is detected, in order to grasp the height of the projection portion, the presence/absence and the position of the projection portion may be specified by lowering the height of the shaping stage 7 by a certain amount t and causing the projection portion detector 12 to perform scanning in the X direction again in this state. If the projection portion is not detected at a position where the projection portion has been detected previously, the height of the projection portion can be obtained as being t or larger and smaller than 2×t with respect to the surface of the powder layer at the time of the previous laser irradiation. In addition, in the case where the projection portion is detected at the position where the projection portion has been detected previously, the operation of further lowering the height of the shaping stage 7 by a certain amount t and scanning by the projection portion detector 12 is repeated until the deformation of the plate spring pair 18 caused by the contact with the projection portion is no longer detected. The height of the projection portion is derived as a value between the accumulated value of the movement amount of the shaping stage 7 in the Z direction until the deformation of the plate spring pair 18 is no longer detected and a value obtained by subtracting the certain amount t from the accumulated value.

Although the movement amount of the shaping stage in each detection of the projection portion is set to be equal to the thickness of one powder layer, this value can be appropriately increased or reduced.

In addition, although the roller serving as the flattening mechanism and the projection portion detector are mounted and moved on the same carriage, these may be each mounted on a different carriage. In this case, the roller does not have to be moved when detecting the projection portion, and therefore there is a merit that the risk of the projection portion and the roller colliding is eliminated. However, in the case where these are mounted on different carriages, controlling the positions of the roller and the projection portion detector in the Z direction in the order of micrometers in the entirety of the operation range requires very high costs for guiding and the like, and there is a risk that the positions change over time due to the rigidity of the parts or the like. Therefore, mounting the flattening mechanism 10 and the projection portion detector 12 on the same carriage is more advantageous because the relative positions of the roller and the projection portion detector are easier to control and the configuration of the apparatus is simpler.

Figure 11E:
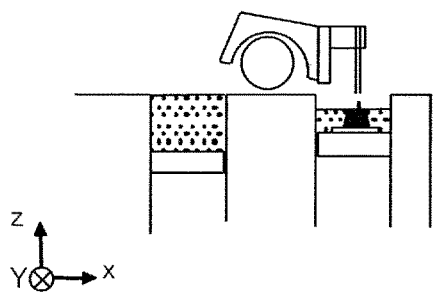
Figure 11F:
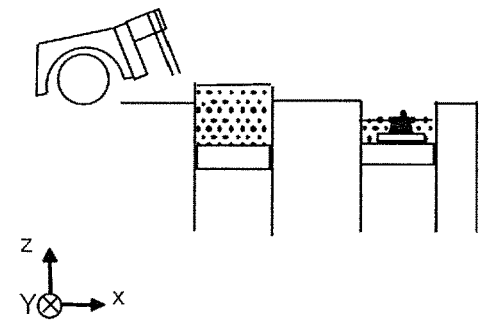

FIG. 11E illustrates a state in which the projection portion is no longer detected. Next, as illustrated in FIG. 11F, the projection portion detector 12 is lifted to such a position as not to interrupt laying the powder material, the roller serving as the flattening mechanism 10 is moved back to the position exceeding the supply stage 4 by the carriage, the supply stage 4 is lifted, and thus the powder material is pushed up.

Figure 11G:
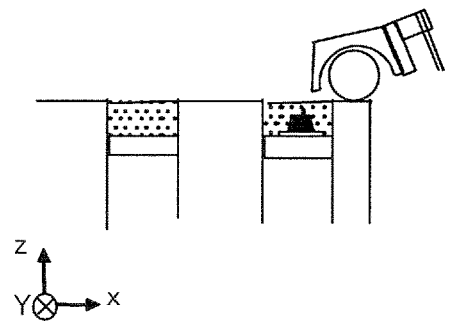
Figure 11H:
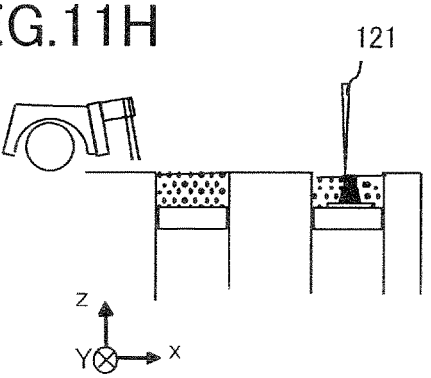

Then, as illustrated in FIG. 11G, the roller of the flattening mechanism 10 is moved toward the shaping stage 7, and thus the powder material is moved to the shaping plate 109. Further, the roller of the flattening mechanism 10 passes above the shaping stage 7, and therefore the powder material that has been conveyed is accumulated above the shaping stage 7 and the shaped object 13 that has been already shaped. The powder material is leveled by the roller, therefore the powder layer is formed such that the upper surface of the powder material conveyed to the shaping stage 7 covers the entirety of the projection. The thickness of the powder layer at this time is corresponds to the movement amount of the shaping stage 7 by which the shaping stage 7 has been lowered until the projection is no longer detected, and is, for example, 2×t corresponding to the thickness of two layers in the case where the shaping stage 7 is lowered twice.

Then, by radiating a laser beam 121 in a laser irradiation condition appropriate for the thickness of the powder layer that has been obtained in advance, shaping can be continued without the roller of the flattening mechanism hitting the projection.

EXAMPLES

As Examples, laser irradiation conditions for different thicknesses of the powder layer will be described in detail.

In Examples, results of obtaining the conditions for shaping SUS316 powder having a median particle diameter of 20 μm by an experiment of increasing the thickness of the powder layer by an increment of 30 μm are shown in Table 1. Shaping was possible when the thickness of the powder layer was 150 μm or smaller, but shaping was not possible when the thickness was 180 μm. To be noted, it was found that the condition in which shaping is possible has a range for each thickness. The ranges are shown parenthesized. Further it was found that the temperature also changes depending on the shape of the shaped object, the heat capacity of the shaping plate, and the distance from the shaping plate because heat dissipates differently. Since whether shaping can be performed or not is also greatly affected by the temperature, it is preferable that a value for each condition is obtained in advance by an experiment.

TABLE 1

Parameters with which good shaping can be performed (SUS316 powder having a diameter of 20 μm)

| Thickness of powder layer (μm) | Laser power (W) | Scanning speed (mm/sec) | Amount of defocusing (mm) | Irradiation beam diameter (μm) |
|---|---|---|---|---|
| 30 | 44 (40~60) | 300 (200~600) | 0 | 35 |
| 60 | 60 (60~100) | 250 (200~800) | 0 | 35 |
| 90 | 80 (80~120) | 250 (200~600) | 0 | 35 |
| 120 | 80 (80~120) | 200 (200~400) | 3 | 140 |
| 150 | 80 (80~120) | 150 (100~300) | 6 | 240 |
| 180 | — | — | — | — |

By appropriately forming a powder layer thicker than the projection by the series of steps described above, shaping can be performed in the case where an unintended projection is generated and a shaping defect is caused by interference between the projection and a powder laying mechanism in a conventional apparatus.

Third Exemplary Embodiment

A manufacturing method for a three-dimensionally shaped object and an additive manufacturing apparatus serving as a third exemplary embodiment of the present invention will be described with reference to FIGS. 7 and 8. Although the flattening mechanism 10 and the projection portion detector 12 are integrated and mounted on the same carriage in the first exemplary embodiment, these are mounted on different carriages such that these can be each independently moved in the third exemplary embodiment.

Figure 7:
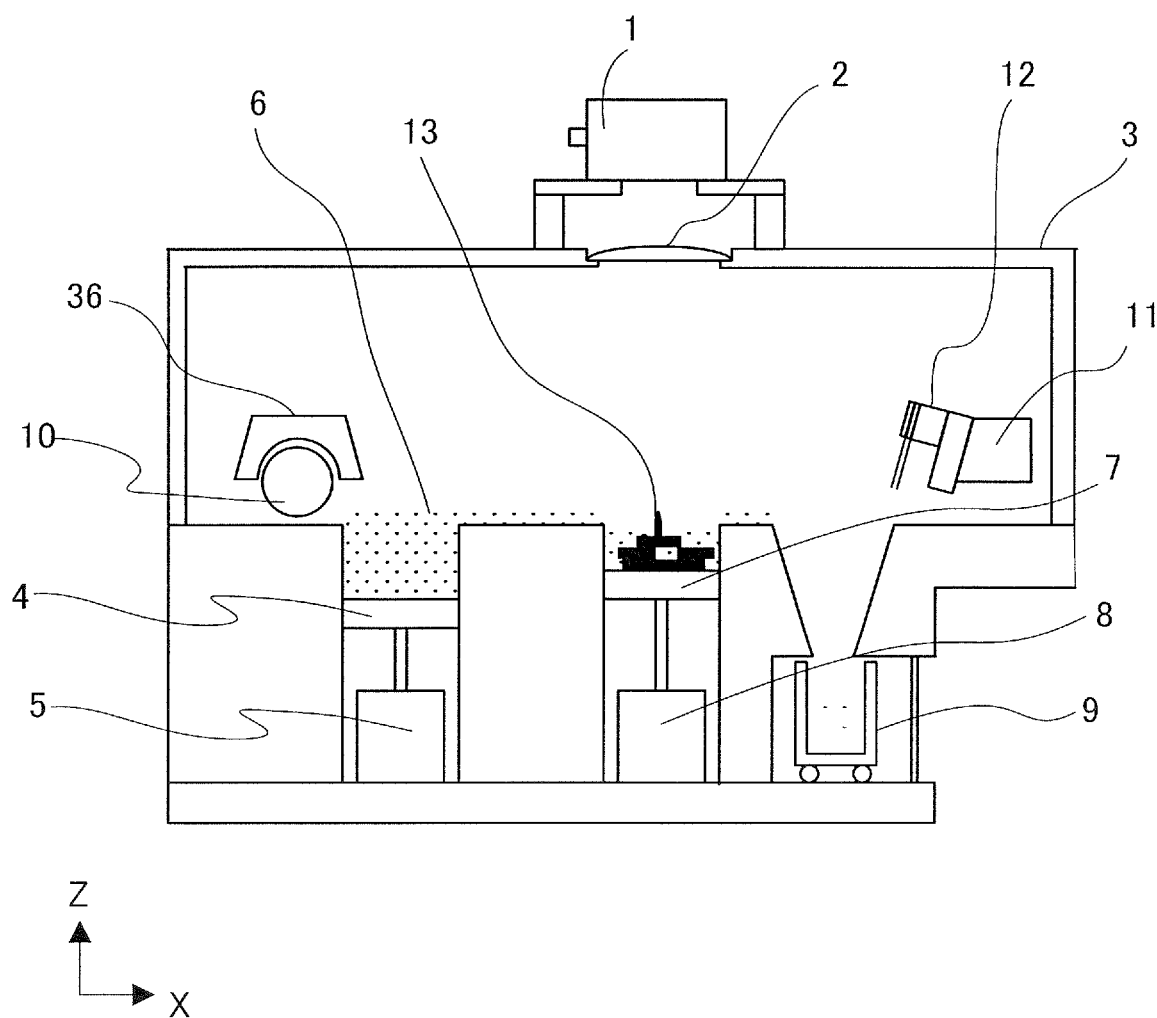
Figure 8:
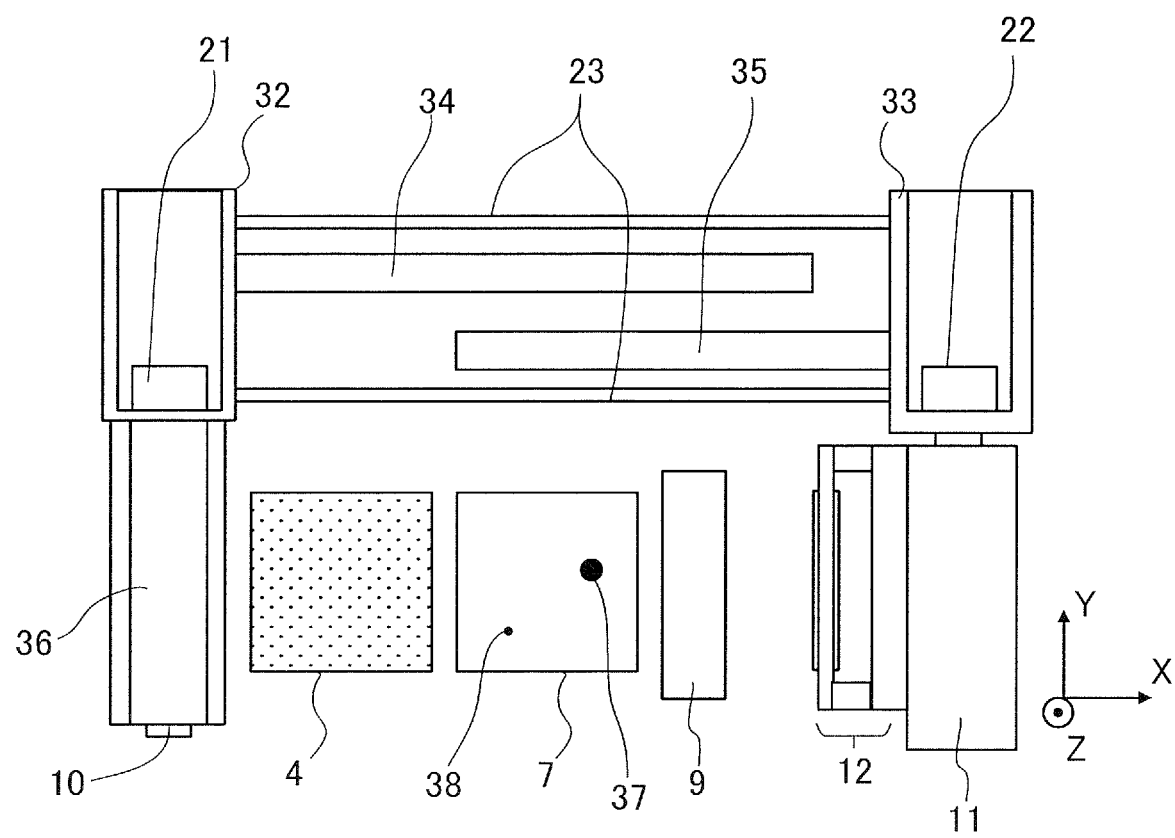
FIG. 8 is a plan view of the additive manufacturing apparatus of the third exemplary embodiment.

FIG. 7 is a schematic front view of the additive manufacturing apparatus of the third exemplary embodiment in which the inside thereof is seen through, and FIG. 8 is a plan view of the additive manufacturing apparatus as viewed from above. The same elements as the first exemplary embodiment are denoted by the same numerals.

Two carriages 32 and 33 are provided for a guide 23, and driving portions 34 and 35 are respectively provided therefor. The flattening mechanism 10 and a positioning mechanism 36 are mounted on the carriage 32, and the projection portion detector 12 and the positioning mechanism 11 are mounted on the carriage 33. The flattening mechanism 10 and the projection portion detector 12 can independently scan the shaping stage 7. The present exemplary embodiment employing such a configuration has following characteristics unlike the first exemplary embodiment illustrated in FIGS. 1 and 5.

In the first exemplary embodiment, the flattening mechanism 10 and the projection portion detector 12 are mounted on the one carriage 20, and are therefore configured as a single carriage. However, after detecting a first projection portion by the projection portion detector 12, scanning cannot be continued until the detected object is removed. This is because there is a risk that the flattening mechanism 10 comes into contact with the first projection portion in the case where the scanning is continued without removing the projection portion. Therefore, in the case where the projection portion is detected by the projection portion detector 12 by performing scanning movement of the carriage, the presence/absence of the next projection portion is inspected after removing the detected projection portion. In the case where a plurality of projection portions are formed on the shaping stage, the detection and removal are performed on the entire region of the shaping stage 7 by repeating such a procedure, and then a powder layer is formed.

In contrast, in the present exemplary embodiment, the projection portion detector 12 is mounted on a carriage different from a carriage of the flattening mechanism 10. Therefore, when scanning movement of the carriage 33 mounting the projection portion detector 12 is performed and a projection portion is detected, the coordinates of the projection portion are recorded, and scanning can be continued further. For example, in the case where projection portions 37 and 38 are present on the shaping stage 7 as illustrated in FIG. 8, the projection portion detector 12 scans the shaping stage 7 and detects the projection portion 37 first. After obtaining the coordinates of the projection portion 37, scanning by the projection portion detector 12 is continued without removing the projection portion 37, that is, without retracting the projection portion detector 12. Then, the projection portion 38 is detected, and the coordinates thereof are obtained in a similar manner. The scanning is continued without removing the projection portion 38 either, and is finished after confirming that the end of the shaping stage 7 is reached. As described above, the entire region of the shaping stage can be continuously scanned by the projection portion detector 12, and all coordinates of all projection portions formed on the shaping stage 7 can be recorded. Therefore, even in the case where a plurality of projection portions are generated, the detection operation is finished in a shorter time than the first exemplary embodiment. Then the detected projection portions may be removed.

As described above, also in the present exemplary embodiment, a projection portion detector including a plate-like probe is provided, and thus the presence/absence of a projection portion is checked before forming the powder layer. By using the plate-like probe, the projection portion can be detected with high reliability, and also position information of the projection portion can be obtained. In the case where a projection portion is detected, by forming the powder layer after removing the projection portion, the contact between the flattening mechanism and the projection portion can be avoided, stop of flattening and damages on the flattening mechanism can be prevented, the additive manufacturing operation can be stabilized, and thus the shape precision of the shaped object can be improved.

Fourth Exemplary Embodiment

Figure 9:
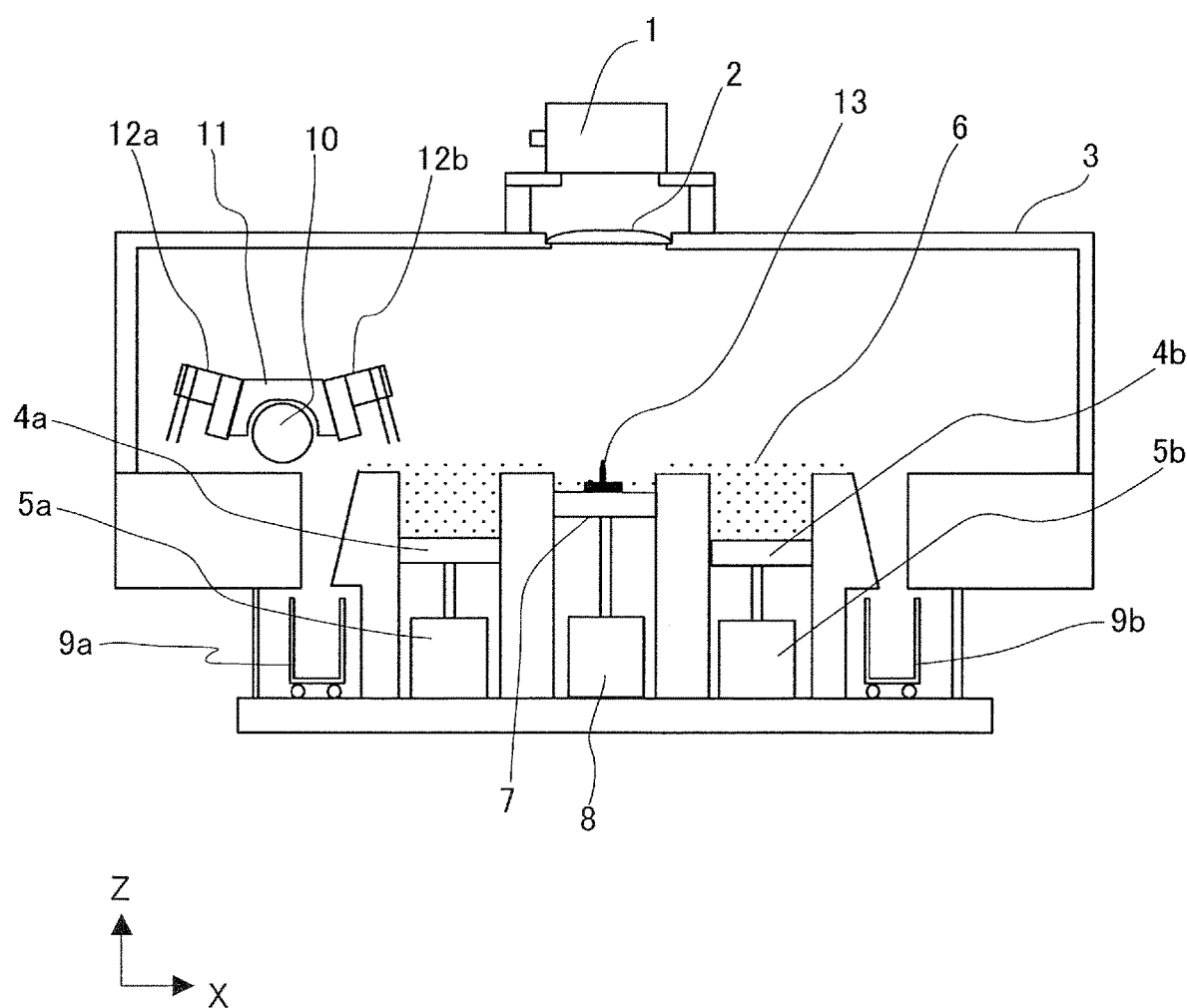

A manufacturing method for a three-dimensionally shaped object and an additive manufacturing apparatus serving as a fourth exemplary embodiment of the present invention will be described with reference to FIG. 9. FIG. 9 is a schematic front view of the additive manufacturing apparatus of the fourth exemplary embodiment in which the inside thereof is seen through. The same elements as the first exemplary embodiment are denoted by the same numerals.

In the additive manufacturing apparatus of the fourth exemplary embodiment, the flattening mechanism 10, a projection portion detector, and the positioning mechanism 11 are mounted on one carriage similarly to the first exemplary embodiment. In the additive manufacturing apparatus of the first exemplary embodiment, the supply stage 4 is provided only on the left side of the shaping stage 7 in FIG. 1, and therefore the powder material can be conveyed to the shaping stage 7 only from the left side. Therefore, the carriage needs to be moved back to the left side after forming the powder layer.

In contrast, in the additive manufacturing apparatus of the fourth exemplary embodiment, as illustrated in FIG. 9, a supply stage 4a, a driving mechanism 5a for the supply stage 4a, a supply stage 4b, and a driving mechanism 5b for the supply stage 4b are disposed on respective sides of the shaping stage 7. As a result of this, the powder layer can be formed regardless of from which of the left side and the right side of the shaping stage 7 the scanning by the flattening mechanism 10 is performed.

Therefore, a projection portion detector 12a is provided on a portion of the positioning mechanism 11 on the left side of the flattening mechanism 10 and a projection portion detector 12b is provided on a portion of the positioning mechanism 11 on the right side of the flattening mechanism 10 such that a projection portion can be detected in both cases where the scanning direction is leftward and where the scanning direction is rightward. The scanning on the shaping stage does not always have to be performed from one side by the projection portion detector, and thus the scanning direction can be reversed each time one solidified layer is formed.

In the case where the carriage is on the left side of the shaping stage 7, the shaping stage 7 is lowered, the carriage is moved to the shaping stage 7, and the height of the projection portion detector 12b is adjusted by the positioning mechanism 11 at an end of the shaping stage 7. Then, scanning is performed by the projection portion detector 12b, and the carriage is retracted and the projection portion is removed when the projection portion is detected. Then, the height of the projection portion detector 12b is adjusted again at an end of the shaping stage 7, and scanning is performed to detect a projection portion.

After scanning on the entire region of the shaping stage 7 is finished, the carriage moves back to the left side, the supply stage 4a is lifted, the powder material on the supply stage 4a is conveyed onto the shaping stage 7 to form a powder layer by the flattening mechanism 10, and the carriage moves to a collection mechanism 9b on the right side. A laser beam is radiated in this state, and the powder layer above the shaping stage 7 is selectively fused and solidified.

After the irradiation step with the laser beam is finished, to form the next powder layer, the shaping stage 7 is lowered, the carriage present on the right side is moved toward the shaping stage 7, and the height of the projection portion detector 12a is adjusted by the positioning mechanism 11 at an end of the shaping stage 7. This time, scanning by the projection portion detector 12a is performed toward the left side, and thus detection and removal of a projection portion is performed. When the projection portion detector 12a reaches an end of the shaping stage 7, the carriage is moved back to the right end, the supply stage 4b is lifted, the powder material is conveyed onto the shaping stage 7 by the flattening mechanism 10, thus a new powder layer is formed, and the carriage is moved to a collection mechanism 9a on the left side. A laser beam is selectively radiated in this state, and thus a solidified layer is formed.

According to the configuration of the present exemplary embodiment, the carriage does not have to be moved back after forming a powder layer by the flattening mechanism 10, and thus the time for forming the powder layer can be shortened.

As described above, also in the present exemplary embodiment, a projection portion detector including a plate-like probe is provided, and thus the presence/absence of a projection portion is checked before forming the powder layer. By using the plate-like probe, the projection portion can be detected with high reliability, and also position information of the projection portion can be obtained. In the case where a projection portion is detected, by forming the powder layer after removing the projection portion, the contact between the flattening mechanism and the projection portion can be avoided, stop of flattening and damages on the flattening mechanism can be prevented, the additive manufacturing operation can be stabilized, and thus the shape precision of the shaped object can be improved.

Fifth Exemplary Embodiment

Figure 10:
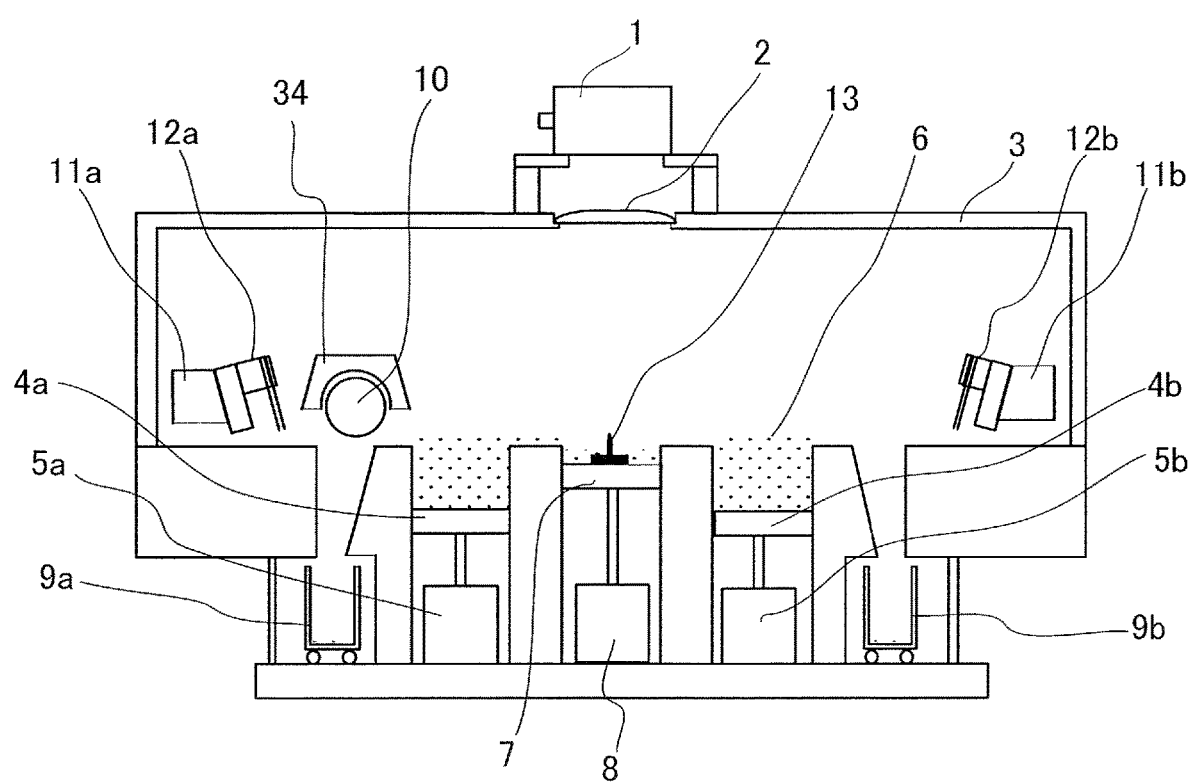

A manufacturing method for a three-dimensionally shaped object and an additive manufacturing apparatus serving as a fifth exemplary embodiment of the present invention will be described with reference to FIG. 10. FIG. 10 is a schematic front view of the additive manufacturing apparatus of the fifth exemplary embodiment in which the inside thereof is seen through. The same elements as the first exemplary embodiment are denoted by the same numerals.

The additive manufacturing apparatus of the fifth exemplary embodiment has a configuration in which both characteristics that scanning movement of the flattening mechanism 10 and a projection portion detector can be performed independently on different carriages, which is a characteristic of the third exemplary embodiment, and that the scanning can be performed both leftward and rightward, which is a characteristic of the fourth exemplary embodiment, are achieved at the same time. As a result of this, the time required for forming a powder layer can be shortened as compared with the configuration of the third exemplary embodiment.

Therefore, as illustrated in FIG. 10, a positioning mechanism 11a and the projection portion detector 12a mounted on a carriage are disposed on the left side of the flattening mechanism 10, and a positioning mechanism 11b and the projection portion detector 12b mounted on a carriage are disposed on the right side of the flattening mechanism 10.

In the case where the flattening mechanism 10 is present on the left side of the shaping stage 7, the projection portion detector 12b and the positioning mechanism 11b provided on the right side are moved to the shaping stage 7 by the carriage. The height of the projection portion detector 12b is adjusted by the positioning mechanism 11b, and scanning is performed on the shaping stage 7 toward the left side. In the case where a projection portion is detected, the scanning is continued until the scanning to the left end of the shaping stage 7 is completed, while recording the detected coordinates on the shaping stage 7. Then, the projection portion detector 12b and the positioning mechanism 11b are moved back to the right side by the carriage, and the removal operation is performed by using a laser beam or a cutting tool in the vicinity of the detected coordinates. Then, whether or not the projection portion above the shaping stage 7 is removed is checked by using the projection portion detector 12b, the positioning mechanism 11b, and the carriage.

After it is confirmed that the projection portion is removed, the supply stage 4a is lifted, scanning movement of the flattening mechanism 10 is performed by the carriage such that the powder material on the supply stage 4a is conveyed onto the shaping stage 7, and thus a powder layer is formed on the shaping stage 7. At this time, in the case where the supply stage 4b is lowered, an excess powder material that remains after forming the powder layer on the shaping stage 7 can be collected on the supply stage 4b side, and therefore the powder material can be efficiently used.

The flattening mechanism 10 that has formed the powder layer on the shaping stage 7 does not move back to the left side position, and remains still above the collection mechanism 9b on the right side. A solidified layer is manufactured by radiating a laser beam to the powder layer formed on the shaping stage 7. To form the next powder layer, the shaping stage 7 is lowered, then the projection portion detector 12a and the positioning mechanism 11a are moved to scan the shaping stage 7 from the left side toward the right side, and thus a projection portion is detected. In the case where a projection portion is detected, a removal confirmation operation is performed after the removal operation. After it is confirmed that there is no projection portion by the projection portion detector 12a and the positioning mechanism 11a, the powder material on the supply stage 4b is conveyed onto the shaping stage 7 by the flattening mechanism 10, and thus a new powder layer is formed on the stage 7. At this time, in the case where the supply stage 4a is lowered, a residual powder material can be collected by the supply stage 4a, and thus the powder material can be used efficiently.

As described above, by employing such a configuration as illustrated in FIG. 10, the returning operation of the flattening mechanism 10 is not required when forming a powder layer, and thus the time required for formation of a powder layer is shortened.

In addition, according to the present exemplary embodiment, a projection portion detector including a plate-like probe is provided, and thus the presence/absence of a projection portion is checked before forming the powder layer. By using the plate-like probe, the projection portion can be detected with high reliability, and also position information of the projection portion can be obtained. In the case where a projection portion is detected, by forming the powder layer after removing the projection portion, the contact between the flattening mechanism and the projection portion can be avoided, stop of flattening and damages on the flattening mechanism can be prevented, the additive manufacturing operation can be stabilized, and thus the shape precision of the shaped object can be improved.

OTHER EMBODIMENTS

Embodiments of the present invention are not limited to the first to fifth exemplary embodiments described above, and various modifications can be made within the technical concept of the present invention by appropriately changing and combining elements of the exemplary embodiments.

For example, the flattening mechanism 10 is not limited to a roller, and there is no problem using other means capable of flattening the powder layer such as a squeegee or a blade.

The energy beam source for heating the powder layer does not always have to be a laser beam source, and may be any light source as long as a sufficient heating energy can be radiated to a desired position of the powder layer.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-152012, filed Aug. 10, 2018, and Japanese Patent Application No. 2019-126029, filed Jul. 5, 2019, which are hereby incorporated by reference herein in their entirety.

What is claimed is:

1. An additive manufacturing apparatus comprising:
   a powder layer forming portion configured to move a flattening mechanism at a predetermined height from a shaping stage to form a powder layer on the shaping stage;
   an energy beam source configured to radiate an energy beam to the powder layer formed by the powder layer forming portion to fuse or sinter the powder layer so that a solidified layer is formed; and
   a contact detection sensor comprising a probe provided with an elastic body, the contact detection sensor being configured to scan a lower end of the probe at a constant height with respect to the shaping stage and detect deformation of the elastic body,
   wherein presence or absence of a projection portion on a surface of the solidified layer is detected by using the contact detection sensor.

2. The additive manufacturing apparatus according to claim 1, wherein the probe comprises a plate spring band in which a plurality of plate springs are arranged along a predetermined direction and connected to form a pectinate shape, and
   wherein the contact detection sensor comprises an optical sensor configured to detect deformation of the plurality of plate springs.

3. The additive manufacturing apparatus according to claim 2, wherein a position of the projection portion in the predetermined direction is detected on a basis of which of the plurality of plate springs is deformed.

4. The additive manufacturing apparatus according to claim 1, wherein the probe comprises a plurality of plate spring pairs each comprising two plate springs disposed in opposition to each other with a predetermined interval therebetween, and the contact detection sensor comprises a conduction sensor configured to detect electrical conduction between the two plate springs of each plate spring pair.

5. The additive manufacturing apparatus according to claim 4, wherein the plurality of plate spring pairs are arranged along a predetermined direction, and
   wherein a position of the projection portion in the predetermined direction is detected on a basis of for which of the two plate springs of the plate spring pairs the electrical conduction has been detected.

6. The additive manufacturing apparatus according to claim 1, wherein the contact detection sensor is configured to scan the probe along a scanning direction, and
   wherein a position of the projection portion in the scanning direction of the probe is detected on a basis of a scanning position of the probe at a time when the probe contacts the projection portion.

7. The additive manufacturing apparatus according to claim 1, wherein the powder layer forming portion forms, on the solidified layer, a new powder layer having a thickness larger than a height of the projection portion, in a case where the probe has contacted the projection portion.

8. The additive manufacturing apparatus according to claim 1, wherein, in a case where the probe has contacted the projection portion, the powder layer forming portion forms a new powder layer on the solidified layer after removing the projection portion.

9. The additive manufacturing apparatus according to claim 1, further comprising a carriage on which the powder layer forming portion and the contact detection sensor are mounted.

10. The additive manufacturing apparatus according to claim 9, wherein the contact detection sensor is disposed at a position downstream of the powder layer forming portion in a movement direction of the carriage in which the carriage moves when the powder layer forming portion forms the powder layer.

11. The additive manufacturing apparatus according to claim 1, further comprising:
    a first carriage on which the contact detection sensor is mounted; and
    a second carriage configured to independently move on which a second contact detection sensor is mounted.

12. The additive manufacturing apparatus according to claim 1, wherein, when a thickness of the powder layer is t, a distance from the shaping stage to the lower end of the probe is set smaller than a distance from the shaping stage to a lower end of the flattening mechanism and larger than $(n-1) \times 1$, before forming an $n^{th}$ powder layer.

13. A method for manufacturing a three-dimensionally shaped object, the method comprising:
    a powder layer forming step of forming a powder layer on a shaping stage by moving a flattening mechanism at a predetermined height from the shaping stage;

a solidification step of forming a solidified layer by radiating an energy beam to the powder layer flattened in the powder layer forming step; and a detection step of detecting, by using a contact detection sensor that scans the lower end of a probe provided with an elastic body at a constant height with respect to the shaping stage and by detecting deformation of the elastic body, whether or not a projection portion having a height that interferes with the powder layer forming portion in a case where the powder layer forming portion forms a powder layer on the solidified layer is present on the solidified layer.

14. The method according to claim 13, wherein the probe comprises a plate spring band in which a plurality of plate springs are arranged in a predetermined direction and connected to form a pectinate shape, and wherein the contact detection sensor comprises an optical sensor configured to detect deformation of the plurality of plate springs.

15. The method according to claim 13, wherein the probe comprises a plurality of plate spring pairs each comprising two plate springs disposed in opposition to each other with a predetermined interval therebetween, and the contact detection sensor comprises a conduction sensor configured to detect electrical conduction between the two plate springs of each plate spring pair.

16. The method according to claim 13, wherein, in a case where the projection portion has been detected in the detection step, a second powder layer having a thickness larger than the predetermined height is formed and flattened in a predetermined region where the powder layer is formed on the shaping stage by using the powder layer forming portion.

17. The method according to claim 13, further comprising:

a removal step of removing the projection portion in a case where the projection portion has been detected in the detection step; and a second powder layer forming step of forming and flattening a second powder layer of a predetermined thickness in a predetermined region where the powder layer is formed on the shaping stage by using the powder layer forming portion.

18. The method according to claim 17, wherein detection of a projection portion is performed for entirety of the predetermined region in the detection step, and the removal step is performed after completing the detection step.

19. The method according to claim 13, wherein a predetermined region where the powder layer is formed on the shaping stage is scanned from one direction by the contact detection sensor in the detection step.

20. The method according to claim 13, further comprising:

a second powder layer forming step of forming and flattening a second powder layer of a predetermined thickness in a predetermined region where the powder layer is formed on the shaping stage by using the powder layer forming portion, after the detection step;

a second solidification step of forming a second solidified layer by radiating an energy beam to the second powder layer; and a second detection step of detecting, by using a second contact detection sensor comprising a probe, whether or not a projection portion having a height that interferes with the powder layer forming portion in a case where the powder layer forming portion forms a powder layer on the second solidified layer is present on the second solidified layer, wherein a scanning direction in which the second contact detection sensor moves in the second detection step is opposite to the scanning direction in which the contact detection sensor moves in the detection step.

21. The method according to claim 13, wherein, when a thickness of the powder layer is t, a distance from the shaping stage to the lower end of the probe is set smaller than a distance from the shaping stage to a lower end of the flattening mechanism and larger than $(n-1) \times 1$, before forming an $n^{th}$ powder layer.

* * * * *